United States Patent
Sato et al.

(10) Patent No.: US 10,848,091 B2
(45) Date of Patent: Nov. 24, 2020

(54) MOTOR UNIT AND MULTI-MOTOR SYSTEM

(71) Applicant: Nidec Corporation, Kyoto (JP)

(72) Inventors: Motoki Sato, Kyoto (JP); Tetsuya Tabuchi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/472,329

(22) PCT Filed: Dec. 21, 2017

(86) PCT No.: PCT/JP2017/045951
§ 371 (c)(1),
(2) Date: Jun. 21, 2019

(87) PCT Pub. No.: WO2018/117221
PCT Pub. Date: Jun. 28, 2018

(65) Prior Publication Data
US 2019/0379314 A1     Dec. 12, 2019

(30) Foreign Application Priority Data

Dec. 22, 2016  (JP) ................................. 2016-250021

(51) Int. Cl.
*H02K 17/34* (2006.01)
*H02P 1/54* (2006.01)
(Continued)

(52) U.S. Cl.
CPC ...... *H02P 23/0077* (2013.01); *G05B 19/4155* (2013.01); *H02P 5/74* (2013.01); *G05B 2219/43196* (2013.01)

(58) Field of Classification Search
CPC .... H02P 23/0077; H02P 5/74; G05B 19/4155
(Continued)

(56) References Cited

U.S. PATENT DOCUMENTS

| | | | | |
|---|---|---|---|---|
| 2013/0103196 A1* | 4/2013 | Monceaux | ............. | A63H 11/18 |
| | | | | 700/253 |
| 2014/0207282 A1* | 7/2014 | Angle | ................. | H04L 12/2809 |
| | | | | 700/257 |
| 2018/0370025 A1* | 12/2018 | Didey | .................... | A63H 11/00 |

FOREIGN PATENT DOCUMENTS

| | | | |
|---|---|---|---|
| JP | 11-282540 A | 10/1999 | |
| JP | 2001-310281 A | 11/2001 | |

(Continued)

OTHER PUBLICATIONS

Official Communication issued in International Patent Application No. PCT/JP2017/045951, dated Mar. 20, 2018.

*Primary Examiner* — Erick D Glass
(74) *Attorney, Agent, or Firm* — Keating & Bennett

(57) ABSTRACT

A motor assembly includes a motor, a control circuit to generate a control signal, a motor driving circuit to cause a current to flow in the motor based on the control signal, a storage to store a first identifier uniquely identifying itself and a second identifier uniquely identifying another motor assembly within the communications network, and a communication circuit. The communication circuit transmits a data frame, in which the first identifier indicates a transmitting end, the second identifier indicates a receiving end, and a request are stored. The communication circuit receives from the other motor assembly a data frame including the second identifier indicating a transmitting end, the first identifier indicating a receiving end, and a request. In response the communication circuit transmits a data frame including the second identifier indicating a receiving end added thereto and the first identifier indicating a transmitting end added thereto.

20 Claims, 16 Drawing Sheets

(51) Int. Cl.
*H02P 5/00* (2016.01)
*H02P 5/46* (2006.01)
*H02P 23/00* (2016.01)
*G05B 19/4155* (2006.01)
*H02P 5/74* (2006.01)

(58) Field of Classification Search
USPC .......................................................... 318/45
See application file for complete search history.

(56) References Cited

FOREIGN PATENT DOCUMENTS

| | | |
|---|---|---|
| JP | 2002-77209 A | 3/2002 |
| JP | 2002-247671 A | 8/2002 |
| JP | 2013-536090 A | 9/2013 |
| JP | 2014-11689 A | 1/2014 |
| WO | 2016/001211 A1 | 1/2016 |

* cited by examiner

*FIG.1A*

| OSI REFER-ENCE MODEL | DATA LINK LAYER | | | | APPLICA-TION LAYER | | |
|---|---|---|---|---|---|---|---|
| FUNCTION | PRE-AMBLE | Start of Frame | RECEIVING-END DEVICE ID | TRANSMIT-TING-END DEVICE ID | COMMON DATA STRUCTURE | CHECK-SUM | End of Frame |
| SIZE (BYTES) | 2 | 1 | 1 | 1 | 3~13 | 1 | 1 |

| FUNCTION | DATA LENGTH | OPERATION-TYPE COMMAND | ATTRIBUTE-TYPE COMMAND | DATA |
|---|---|---|---|---|
| SIZE (BYTES) | 2 | 1 | 0 OR 2 | 0~n |

| FUNCTION | DATA LENGTH | OPERATION-TYPE COMMAND | ATTRIBUTE-TYPE COMMAND | DATA |
|---|---|---|---|---|
| VALUE | 0x00,0x11 (2 BYTES) | 0x02 (Write Data) (1 BYTE) | 0x00,0x74 (Send Status Info Timing) (2 BYTES) | 0xXX (12 BYTES) |

12                                                                                                    12d

| DATA | CURRENT | START TIME UNIT (MILLISE-CONDS) | START TIME (IMMEDIATE-LY) | END TIME UNIT (MILLISE-CONDS) | END TIME (ENDLESS) | CYCLE TIME UNIT (MILLISE-CONDS) | CYCLE (10 MILLI-SECONDS) | RECEIVING END (MOTOR UNIT 32a) |
|---|---|---|---|---|---|---|---|---|
| VALUE | 0x00, 0x48 =Present Current (2) | 0x00= msec (1) | 0x00, 0x00 =default, immediately (2) | 0x00 =msec (1) | 0x00, 0x0A =10 (2) | 0x00 =msec (1) | 0x00, 0x0A =10 (2) | DEVICE ID OF MOTOR UNIT 32a (1) |

12d-1  12d-2  12d-3  12d-4  12d-5  12d-6  12d-7  12d-8

FIG.14
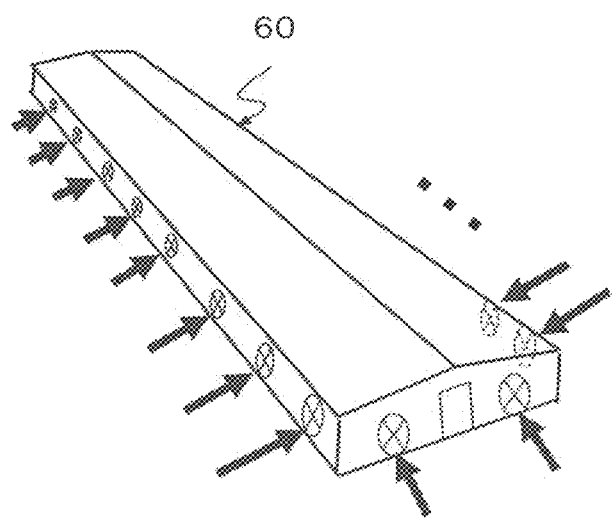
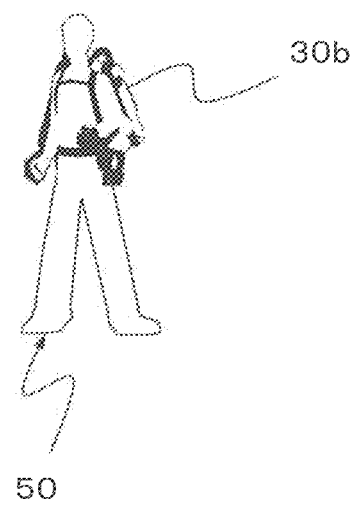

MOTOR UNIT AND MULTI-MOTOR SYSTEM

CROSS REFERENCE TO RELATED APPLICATIONS

This is the U.S. national stage of PCT Application No. PCT/JP2017/045951, filed on Dec. 21, 2017, and priority under 35 U.S.C. § 119(a) and 35 U.S.C. § 365(b) is claimed from Japanese Application No. 2016-250021, filed Dec. 22, 2016; the entire disclosures of each application are incorporated herein by reference.

FIELD OF THE INVENTION

The present disclosure relates to a motor unit and a multi-motor system.

BACKGROUND

Multi-motor systems exist in which a large number of motor units are networked, each motor unit having a motor and a communication circuit. To each motor unit, ID information that can uniquely identify the respective motor unit within the network is previously assigned.

A host terminal would exist in such a multi-motor system, such that communications would be performed between the host terminal and the motor units by utilizing the ID information. When a request is to be transmitted from the host terminal to a certain motor unit, the host terminal exclusively assigns to the request a piece of ID information that determines a motor unit on the receiving end, and transmits it. Receiving the request, the motor unit exclusively assigns its own ID information, indicating the transmitting end, to a response to the request; and the motor unit transmits this to the host terminal.

For example, when the host terminal wants to know a present rotational speed of motor unit A, the host terminal transmits to motor unit A: "receiving-end ID information (motor unit A)+a request for present rotational speed". On the other hand, motor unit A transmits to the host terminal: "transmitting-end ID information (motor unit A)+ information on present rotational speed".

In the above-described multi-motor system, for each motor unit, the transmitting end of a request and the receiving end of a response to the request are always the host terminal. Therefore, being the transmitting end, the host terminal does not need to assign its own ID information to the request; neither does each motor unit need to assign the ID information of the host terminal as the receiving end.

In Japanese Laid-Open Patent Publication No. 2014-11689, for example, a control section which is provided in a parts mounter functions as a host terminal. The control section transmits a command to each of a plurality of individual devices via a plurality of relay stations, and performs processing of information which has been written to an individual frame of communications data that is received from each individual device.

A multi-motor system that performs communications between motor units not by way of a host terminal may be possible. In order to perform inter-motor unit communications in such a multi-motor system, it is not sufficient to merely assign receiving-end ID information to a request to be transmitted, because the motor unit transmitting a response will not know which motor unit the response should be transmitted to.

A multi-motor system that is suitable for performing communications between motor units, and a motor unit for use in such a multi-motor system, are needed.

SUMMARY

A motor assembly according to an example embodiment of the present disclosure is a motor assembly for use in a multi-motor system in which a plurality of motor assemblies perform communications via a communications network. The motor assembly includes a motor, a control circuit to generate a control signal to cause the motor to rotate, a motor driving circuit to cause a current to flow to the motor based on the control signal, a storage device to store a first identifier uniquely identifying the motor assembly and a second identifier uniquely identifying each of the plurality of motor assemblies within the communications network, and a communication circuit to perform transmission and reception of a data frame with another motor assembly in the multi-motor system, wherein, the communication circuit stores to a data frame the first identifier indicating itself as a transmitting end, the second identifier uniquely identifying the other motor assembly as a receiving end, and a request concerning an operation to be performed by the other motor assembly, and transmits the data frame to the other motor assembly, and receives from the other motor assembly a data frame containing the second identifier of the other motor assembly being a transmitting end, the first identifier of the motor assembly itself as a receiving end, and a request concerning an operation to be performed by itself, and, in response to the request from the other motor assembly, transmits a data frame having the second identifier indicating a receiving end added thereto and having the first identifier indicating a transmitting end added thereto.

A motor assembly according to an example embodiment of the present disclosure is a motor assembly for use in a multi-motor system in which a plurality of motor assemblies perform communications via a communications network, the motor assembly including a motor, a control circuit to generate a control signal to cause the motor to rotate, a motor driving circuit to cause a current to flow to the motor based on the control signal, a storage to store a first identifier uniquely identifying the motor assembly and a second identifier uniquely identifying each of the plurality of motor assemblies within the communications network, and a communication circuit to transmit a data frame to another motor assembly in the multi-motor system, the communication circuit storing to the data frame the first identifier indicating itself as a transmitting end, the second identifier uniquely identifying the other motor assembly as a receiving end, and a request concerning an operation to be performed by the other motor assembly, and transmitting the data frame to the other motor assembly.

A motor assembly according to an example embodiment of the present disclosure is a motor assembly for use in a multi-motor system in which a plurality of motor assemblies perform communications via a communications network, the motor assembly including a motor, a control circuit to generate a control signal to cause the motor to rotate, a motor driving circuit to cause a current to flow to the motor based on the control signal, a storage to store a first identifier uniquely identifying the motor assembly itself and a second identifier uniquely identifying each of the plurality of motor assemblies within the communications network, and a communication circuit, wherein, the communication circuit is a communication circuit to receive a data frame from another motor assembly in the multi-motor system, the communication circuit receiving from the other motor assembly a data frame containing the second identifier of the other motor assembly being a transmitting end, the first identifier of the motor assembly itself as a receiving end, and a request concerning an operation to be performed by itself, and, the communication circuit transmitting to the other motor assembly, in response to the request from the other motor assembly, a data frame containing the second identifier indicating a receiving end and the first identifier indicating a transmitting end.

A multi-motor system according to an example embodiment of the present disclosure is a multi-motor system including a plurality of motor assemblies including first, second, and third motor assemblies, and a communications network connecting the plurality of motor assemblies. Each of the plurality of motor assemblies includes a motor, a control circuit to generate a control signal to cause the motor to rotate, a driving circuit to cause a current to flow to the motor based on the control signal, a storage to store an identifier uniquely identifying the motor within the communications network, and a communication circuit to perform communications via the communications network. The control circuit of the first motor assembly generates a first command which includes an instruction to cause status information indicating a state of the receiving motor assembly to be transmitted, an identifier identifying a motor of the third motor assembly being a receiving end of the status information, and a transmission timing of the status information, and transmits the first command to the second motor assembly via the communication circuit. The control circuit, having received the first command second motor assembly, based on the first command and with the transmission timing, transmits a second command containing the status information of the second motor assembly to the third motor assembly.

Another multi-motor system according to an example embodiment of the present disclosure is a multi-motor system including a plurality of motor assemblies, and a communications network connecting the plurality of motor assemblies. Each of the plurality of motor assemblies includes a motor, a control circuit to generate a control signal to cause the motor to rotate, a motor driving circuit to cause a current to flow to the motor based on the control signal, a storage to store an identifier uniquely identifying the motor within the communications network, and a communication circuit to perform communications via the communications network. The respective identifiers of the plurality of motor assemblies are assigned by a predetermined order, and one specific motor assembly that is determined according to the predetermined order arbitrates the communications to be performed within the communications network.

With motor assemblies according to example embodiments of the present disclosure, it is possible to perform many-to-many communications irrespective of whether a host terminal exists or not.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1A is a diagram showing the structure of a data frame 1a according to an example embodiment of the present disclosure for use in wired serial communications.

FIG. 2 is a diagram showing a common data structure 12 according to an example embodiment of the present disclosure.

FIG. 12 shows details of the data field 12d in the Send Status Info Timing command according to an example embodiment of the present disclosure.

FIG. 14 is a diagram showing a person 50 wearing a powered exoskeleton suit 30b and a greenhouse 60 according to an example embodiment of the present disclosure.

DETAILED DESCRIPTION

Multi-motor systems according to example embodiments of the present disclosure each include a plurality of motor assemblies having a communication function, and a communications network that connects the plurality of motor assemblies to one another. In the multi-motor system, a given motor assembly transmits commands to other motor assemblies. In the multi-motor system, there is no need for a host terminal that involves itself in all communications.

Hereinafter, with reference to the attached drawings, a communications protocol concerning commands to be exchanged within the multi-motor system will be described first. Thereafter, the construction and operation of the multi-motor system will be described.

1. Communication Protocol Used in Multi-Motor System

FIG. 1A shows the structure of a data frame 1a for use in wired serial communications. As an example of serial communication, communications under the RS-485 standard are contemplated. The RS-485 standard defines electrical specifications in the physical layer as referred to in the OSI reference model.

The data frame 1a includes various data. For reference sake, in the uppermost row of FIG. 1A, layer-to-layer classifications according to the OSI reference model are shown. In the lowermost row of FIG. 1A, the data size of each data is shown in bytes. The leftmost column in FIG. 1A contains legend. The same also applies to FIG. 1B and FIG. 2 to be referred to later.

For example, the data frame 1a contains a receiving-end device ID 10, a transmitting-end device ID 11, and a common data structure 12. The receiving-end device ID 10 is an identifier identifying a device on the receiving end. The transmitting-end device ID 11 is an identifier identifying a device on the transmitting end. The device on the transmitting end may be a motor assembly having a communication function. The identifier may be an ID (a device identifier or a device ID) or an IP address which, during manufacture, was assigned to each device without repetition, for example. The device ID or IP address is an identifier uniquely indicating a motor assembly within the communications network. The common data structure 12 is a data structure including one or two commands as described later.

Previously, in order to control a motor, it has been sufficient if there only exists a device ID on the receiving end that identifies a motor to be controlled because, once a command and control data are sent while designating a receiving-end device ID, the motor will operate in accordance with the command and control data.

The inventors have sought to establish a multi-motor system never conceived of before, in which a plurality of motors communicate with one another and which as a whole operates in an organic manner. Believing that a new communications protocol is needed to for that purpose, the inventors have newly defined the transmitting-end device ID 11 and the common data structure 12.

Figure 1B:
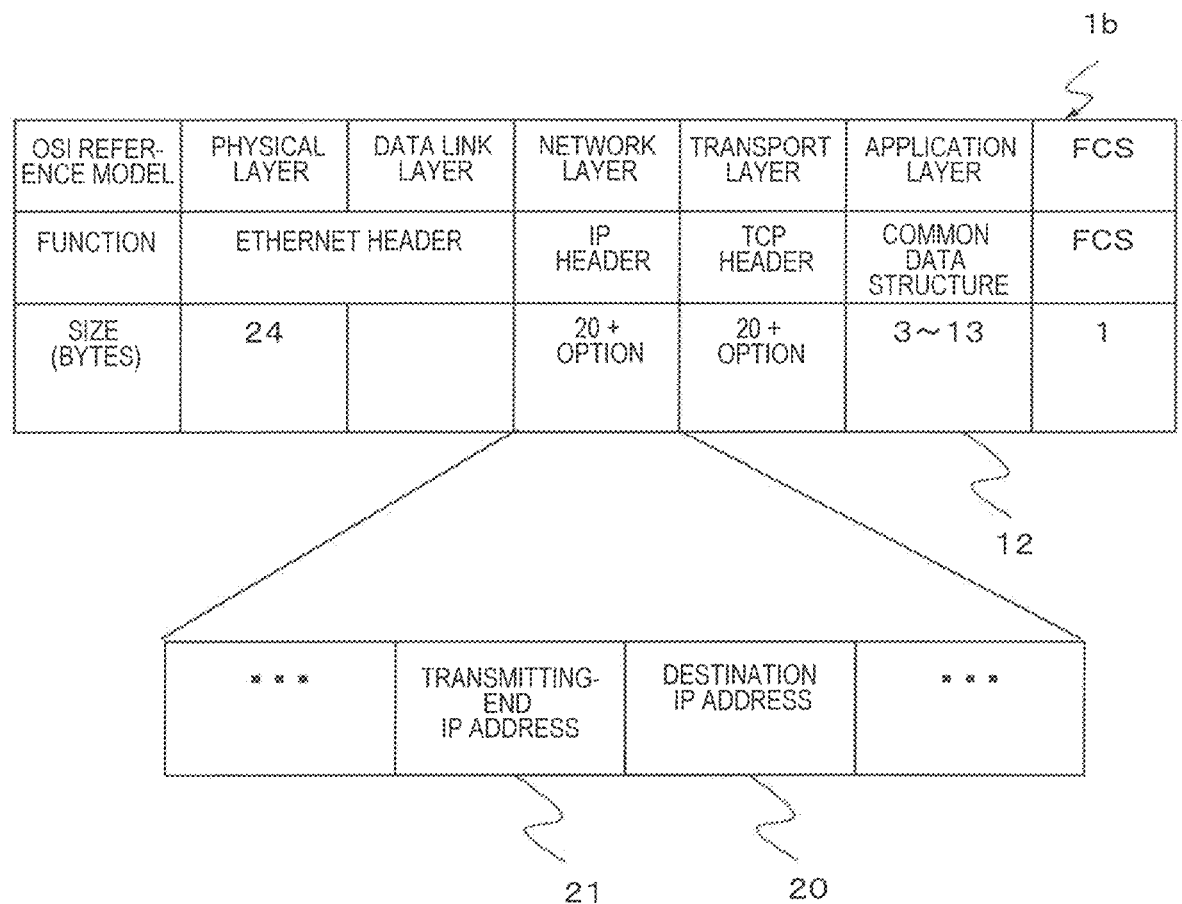
FIG. 1B is a diagram showing the structure of a data frame 1b according to an example embodiment of the present disclosure for use in wireless communications.

FIG. 1B shows the structure of a data frame 1b for use in wireless communications. An example of wireless communication is contemplated to be communications under the Wi-Fi (registered trademark; the same is also true hereinbelow) standards. The Wi-Fi standards define the specifications of the physical layer and the data link layer as referred to in the OSI reference model.

The data frame 1b includes a plurality of headers for the respective layers in the OSI reference model. To begin with, an IP header is supposed to store a destination IP address 20 and a transmitting-end IP address 21. The inventors have thought that transmitting-end IP address 21 could be utilized as an identifier corresponding to the aforementioned transmitting-end device ID 11. Accordingly, the inventors have decided to utilize the transmitting-end IP address 21 in a communications protocol which is carried out by using the common data structure 12 under the Wi-Fi standards.

Note that the aforementioned wired communication and wireless communication are only exemplary. Any other communications protocol may be used. For example, in the case where a transmitting-end IP address is used for a device on the transmitting end, the IP address belongs to the network layer as referred to in the OSI reference model, and therefore its lower layers, i.e., the physical layer and the data link layer, may be arbitrary.

The inventors have constructed a multi-motor system which realizes inter-motor communications by utilizing an identifier that uniquely indicates a transmitting end within the communications network. The present disclosure is applicable so long as an identifier uniquely indicating a transmitting end is contained in the header or the like. Even in an existing communications protocol, so long as an identifier indicating a transmitting end is contained, it can be utilized for inter-motor communications as an identifier corresponding to the transmitting-end device ID 11. For example, in communications under the Ethernet (registered trademark) standards, a MAC (Media Access Control) address is utilized as an identifier indicating a device on the transmitting end. A MAC address can be utilized as an transmitting-end device ID according to the present disclosure.

FIG. 2 shows the common data structure 12.

The common data structure 12 includes a data length field 12a, an operation command field 12b, an attribute command field 12c, and a data field 12d.

The data length field 12a represents the total number of bytes in the common data structure 12.

The operation command field 12b represents an operation command for operating the motor, for example. The operation command is stated as a numeric value (binary representation) that corresponds to the operation command. Examples of operation commands are Write Data, Read Data, Execution, and Connect. Write Data, Read Data, etc., are operations to be performed by a motor assembly in connection with a motor operation. In other words, an operation command can be said to be a request from another motor assembly, or a request to another motor assembly, that designates an operation to be performed by the motor assembly.

The attribute command field 12c indicates an attribute command that designates an attribute concerning the motor. An attribute command is also stated as a numeric value (binary representation) that corresponds to the command. Examples of attribute commands are Present Angle, Target Angle, Angle Limit, and Serial Number. An attribute command can be said to be a static or dynamic attribute, concerning the motor, that is designated together with an operation command.

In the data field 12d, data for the attribute command field 12c is stated. Examples of data are an angle setting value, a rotational speed setting value, and a serial number value.

The aforementioned common data structure has a relatively short data length that fits in a range from 3 bytes to 13 bytes, for example. EtherCAT, which is another communications protocol, is 32 bytes in size and therefore is able to eliminate congestion and suppress occupancy on the communications paths during communications; furthermore, since operation commands and attribute commands are separately defined, it is easier for the user (programmer) to understand.

The commands to be stored in the operation command field 12b and the attribute command field 12c will be described in conjunction with subsequent example embodiments.

2. Construction of Multi-Motor System

Next, an illustrative example embodiment of a multi-motor system and motor assemblies constituting the multi-motor system will be described.

Instances are increasing where a plurality of motor assemblies are mounted on a single product. In such products, there is an increasing need for a given motor assembly to communicate with other motor assemblies.

Figure 3A:
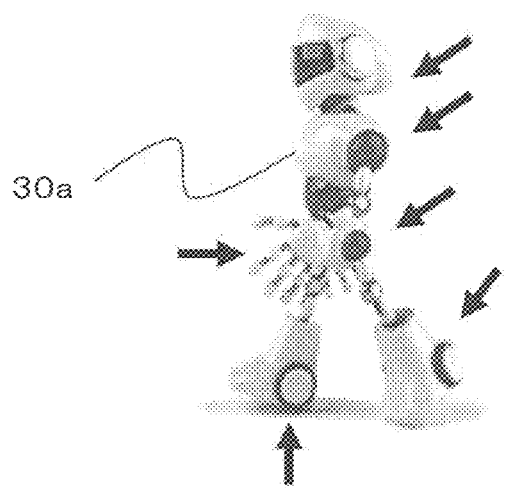
FIG. 3A is a diagram showing the appearance of a communication robot 30 according to an example embodiment of the present disclosure.
Figure 3B:
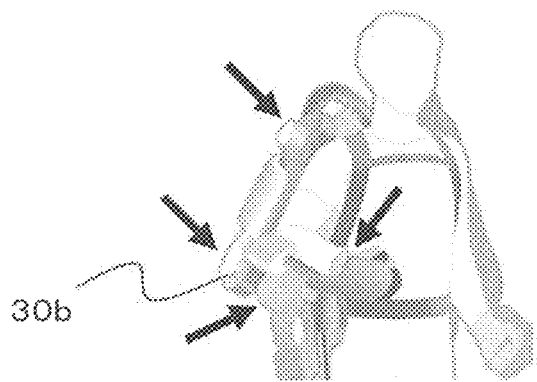
FIG. 3B is a diagram showing the appearance of a powered exoskeleton suit 30b according to an example embodiment of the present disclosure.
Figure 3C:
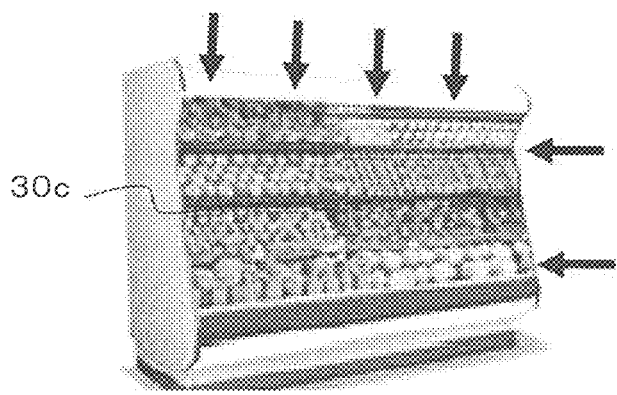
FIG. 3C is a diagram showing the appearance of a commercial refrigerated showcase 30c according to an example embodiment of the present disclosure.

For example, FIG. 3A through FIG. 3C illustrate examples of products having a plurality of motor assemblies mounted thereon.

FIG. 3A shows the appearance of a communication robot 30a. A motor assembly is mounted at each position on the communication robot 30a that is indicated with an arrow. The single communication robot 30a may have about 20 or more motor assemblies attached thereto. As a result of this, the robot 30 is able to achieve complicated motions.

FIG. 3B shows the appearance of a powered exoskeleton suit 30b. The powered exoskeleton suit 30b is used for agricultural field work, care-giving work, and so on. As in the example of FIG. 3A, motor assemblies are mounted on the respective positions indicated with a plurality of arrows. Although the arrows mainly point to only motor assemblies on the right half of the body, motor assemblies are also similarly provided on the respective positions on the left half of the body, correspondingly to the right half of the body. For example, in order to provide assistance for arm strength and leg strength, 20 or more motor assemblies may be used on the powered exoskeleton suit 30b. For reference sake, FIG. 3B illustrates the silhouette of a person wearing the powered exoskeleton suit 30b.

FIG. 3C shows the appearance of a commercial refrigerated showcase 30c. Motor assemblies are mounted on the respective positions indicated with arrows. The single commercial refrigerated showcase 30c may have 10 or more fan motor assemblies attached thereto. This can provide an enhanced cooling efficiency.

In the present example embodiment, the plurality of motor assemblies that are included in any such single device communicate with one another, so as to operate autonomously and cooperatively.

For example, suppose that one of the plurality of fan motor assemblies mounted on the commercial refrigerated showcase 30c is malfunctioning. Even though the malfunctioning fan motor assembly may have stopped rotating, if the other fan motor assemblies maintain their states of rotation as ever, then the cooling efficiency will lower.

Therefore, malfunctioning of a given motor assembly is notified by that fan motor assembly (hereinafter abbreviated as the "malfunctioning unit") itself, to the other fan motor assemblies; alternatively, any other fan motor assembly may detect a loss of communication with that malfunctioning unit. Then, among the plurality of fan motor assemblies, two fan motor assemblies that are near the malfunctioning unit change their own operations. Specifically, the two fan motor assemblies undergo alternating increases and decreases in rotational speed, so as to operate in place of the malfunctioning fan motor assembly. As a result, cooling efficiency can be maintained, and temperature inhomogeneity can be prevented from occurring.

Figure 4:
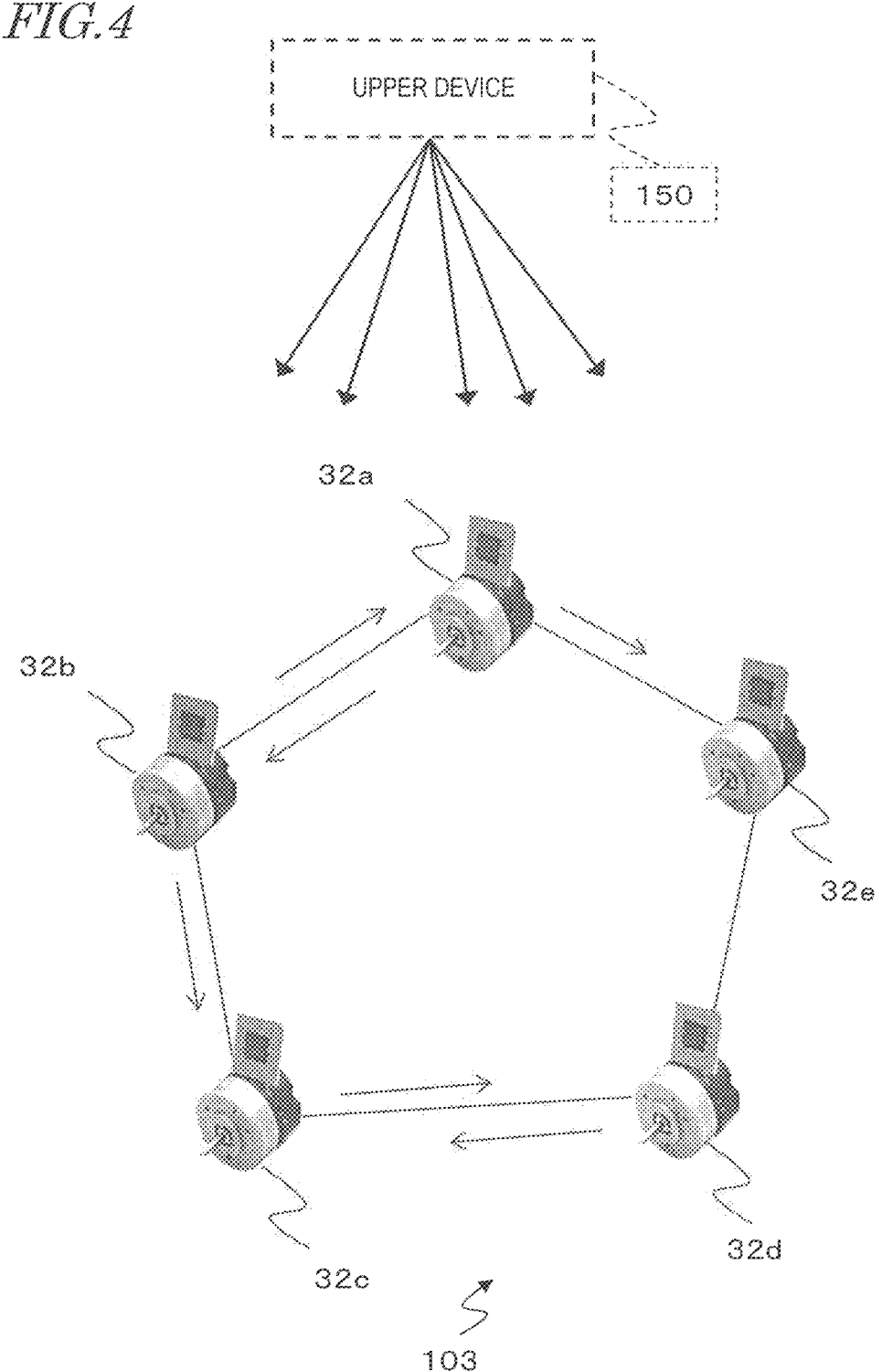
FIG. 4 is a schematic diagram of a multi-motor system 103 according to an example embodiment of the present disclosure.

FIG. 4 is a schematic diagram of a multi-motor system 103 according to the present example embodiment, in which a plurality of motor assemblies 32a through 32e communicate with one another. As will be described later, each motor assembly includes a motor and various circuit elements. Each of the motor assemblies 32a through 32e may begin operation in accordance with an instruction from an upper device 150, for example.

For example, the motor assembly 32a may detect its own malfunction, and transmits a malfunction notice command, indicative of the malfunction, to the other motor assemblies 32b and 32e. Upon receiving the malfunction notice command, the motor assembly(s) 32b and/or 32e transmit a reception response command to the motor assembly 32a, and operate so as to substitute for the motor assembly 32a. An instance of "operating so as to substitute" will be described. In the case where the motor assemblies 32a through 32e are motors for rotating fans, the motor assembly(s) 32b and/or 32e will make their rotational speed(s) higher than before. As a result, the quantity of air to be sent out from the motor assembly 32a may be complemented with the quantity of air that is sent out from the motor assembly(s) 32b and/or 32e. In other words, the motor assembly(s) 32b and/or 32e are able to operate so as to substitute for the motor assembly 32a.

In the case where the motor assembly 32a is a part to drive one joint mechanism in the aforementioned communication robot 30, no matter how much the other motor assemblies may operate in excess, they may not be able to completely substitute for the operation of the motor assembly 32a. In such a case, the motor assembly(s) 32b and/or 32e may operate so as to substitute for the function of the motor assembly 32a within the bounds of a predefined range.

The information concerning malfunctioning of the motor assembly 32a may be passed to the motor assemblies 32c and 32d, via the motor assemblies 32b and 32e, respectively. The motor assemblies 32c and 32d may also operate so as to substitute for the function of the motor assembly 32a within the bounds of a predefined range. Alternatively, the motor assemblies 32c and 32d may give a notice command indicating that assistance cannot be provided to the motor assembly 32a or the upper device 150.

In the multi-motor system 103 in FIG. 4, motor assemblies that are capable of communicating with each other are shown to be connected with lines; however, these illustrated lines and arrows are only an example. Any motor assemblies that are not connected with lines can also communicate with each other.

In order to achieve the aforementioned inter-motor assembly communications, each motor assembly needs to know from which motor assembly in the multitude of motor assemblies a command has been received, and to which motor assembly a command needs to be transmitted. Therefore, the "transmitting-end device ID 11" or the "transmitting-end IP address 21" shown in FIG. 1A can be utilized as a piece of data indicating the transmitting end. The "transmitting-end device ID 11" or the "transmitting-end IP address 21" may also be utilized as a receiving end to transmit a response for the received command.

Hereinafter, the construction of a motor assembly and communications to be performed between motor assembly will be described.

Figure 5:
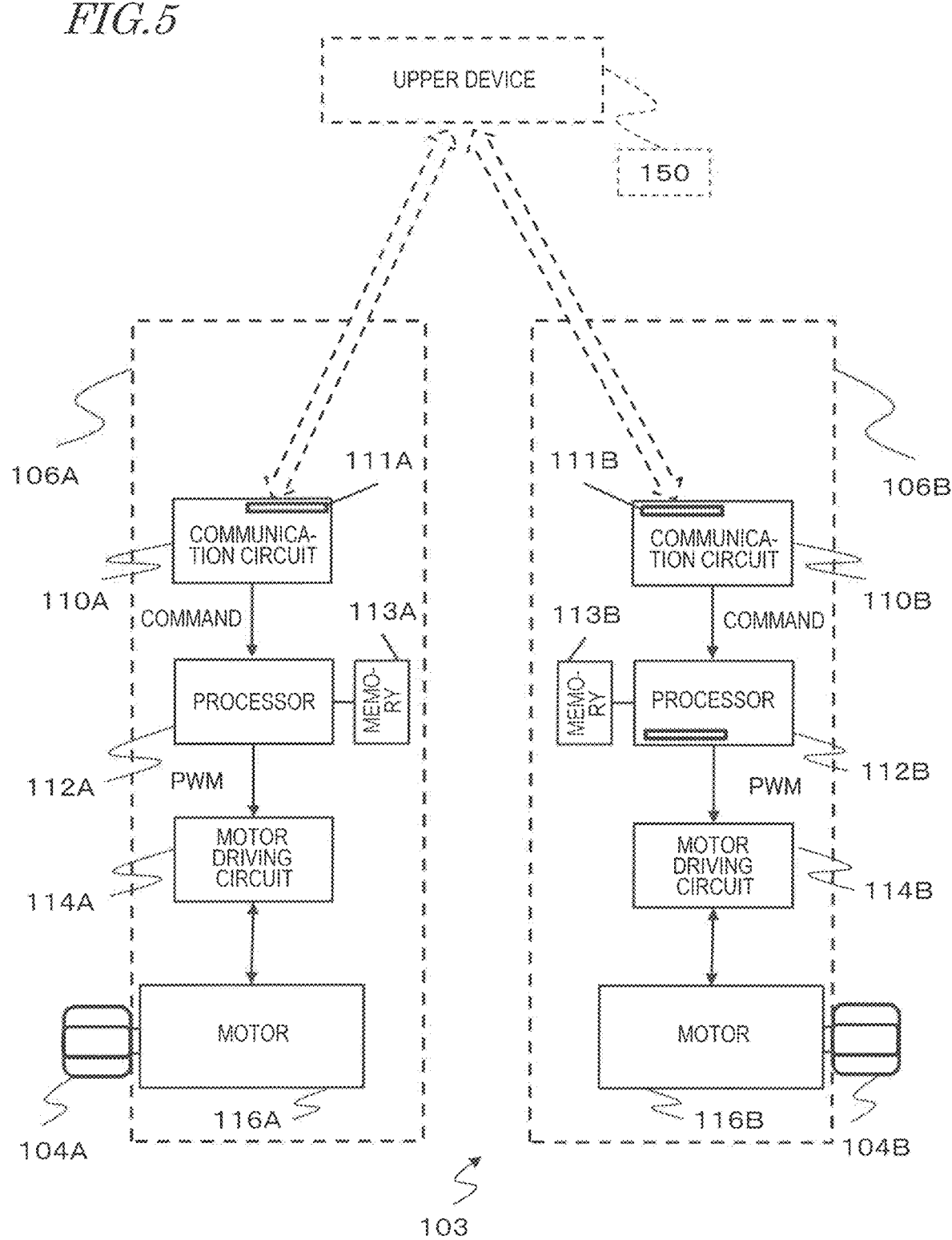
FIG. 5 is a diagram showing an exemplary construction of a multi-motor system 103 according to an example embodiment of the present disclosure including motor assemblies that rotate joints in the communication robot 30 (FIG. 3A).

FIG. 5 shows an exemplary construction of a multi-motor system 103 including motor assemblies for rotating joints of the communication robot 30a (FIG. 3A), according to the present example embodiment. For convenience of illustration, the example of FIG. 5 shows two motor assemblies 106A and 106B; however, there may be three or more of them, as illustrated in FIG. 3A through FIG. 3C and FIG. 4.

The multi-motor system 103 includes motor assemblies 106A and 106B. The motor assembly 106A includes a communication circuit 110A, a processor 112A, a memory 113A, a motor driving circuit 114A, a joint motor 116A, and a joint mechanism 104A. The motor assembly 106B includes a communication circuit 110B, a processor 112B, a memory 113B, a motor driving circuit 114B, a joint motor 116B, and a joint mechanism 104B. The motor assemblies 106A and 106B may be referred to as Intelligent Motors (registered trademark). Although the above description illustrates that the joint mechanisms 104A and 104B respectively are included within the motor assemblies 106A and 106B, they may not be included therein.

In the present specification, the motor assemblies 106A and 106B may perform communications via the upper device 150 shown in FIG. 5, or perform communications of exchanging data frames directly, i.e., not via the upper device 150.

The communication circuits 110A and 110B include buffers 111A and 111B, respectively. Identifiers for respectively identifying the motor assemblies 106A and 106B are stored in the buffers 111A and 111B in advance. Each identifier may be a letter(s) and/or a number that is capable of unique identification in a communications network within the bounds of a communicable range, and may be e.g. an IP address, or the aforementioned ID (device ID) that is assigned for each device without repetition.

When a data frame is received, each communication circuit 110A or 110B performs processing in the physical layer and the data link layer, and determines whether the receiving-end device ID 10 (FIG. 1A) in the data frame matches its own identifier stored in the buffers 111A and 111B. If they match, the communication circuit 110A or 110B continues the processing of the data frame; if they do not match, the communication circuit 110A or 110B discards the data frame.

In the case where wireless communications under the Wi-Fi standards are to be performed, an IP address can be adopted as the aforementioned identifier of its own. The communication circuit 110A or 110B determines whether or not the destination IP address 20 (FIG. 1B) in the data frame matches its own IP address. The subsequent processes are identical to the above-described processes.

If processing of the data frame is to be continued, the communication circuit 110A or 110B further subjects the data frame sequentially to respective processes in the IP layer, the transport layer, etc., of the OSI reference model, and extracts the common data structure 12. As mentioned above, the common data structure 12 includes an operation command 12*b* and the like. The communication circuits 110A and 110B respectively extract the command and transmit it to the processors 112A and 112B.

The processors 112A and 112B are both semiconductor-integrated signal processors. A processor is also referred to as a "signal processing circuit" or a "control circuit". The processors 112A and 112B generate signals for rotating the motors 116A and 116B, respectively, at designated rotational speeds. The signals may be PWM signals, for example. Moreover, the processors 112A and 112B parse the command and data contained in the common data structure 12 that is included in the data frame which has been transmitted from another motor assembly, and performs a process which is in accordance with the content of the command.

The memory 113A or 113B previously retains a table in which other motor assemblies are mapped to the identifiers of the motor assemblies. In other words, an identifier is previously set in the communication circuit of each motor assembly, and this identifier is retained in the memory of any other motor assembly. Once the motor assembly with which to exchange a data frame is decided, the processor 112A or 112B can determine the identifier of that motor assembly, and instructs the communication circuit 111A or 111B of the identifier.

The motor driving circuits 114A and 114B allow a current of a magnitude and a direction that are in accordance with the PWM signals to flow in the motors 116A and 116B, respectively. As a result, the motor 116A or 116B rotates clockwise or counterclockwise. With the motor rotation, the joint mechanism 104A or 104B that is attached to a rotation shaft of the motor also rotates clockwise or counterclockwise. As a result, the joint mechanism operates with a speed, angle, and direction that are in accordance with the motor rotation.

The speed and time, etc., of rotation may be designated as part of a command, by utilizing the attribute command field 12*c* and the data field 12*d* (FIG. 2). The processors 112A and 112B may generate PWM signals so that the motors 116A and 116B will rotate with the designated rotational speed and rotation time.

3. Example Identifiers Indicating a Receiving-End Motor Assembly and a Transmitting-End Motor Assembly As an example, a case will be discussed where the motor assembly 106A wants to know a present rotational speed of the motor assembly 106B. Note that, in the present specification and the drawings, values stated in the data structure will be represented in binary numbers or hexadecimal numbers. These are mere differences in format, and are accordingly selected for simple reasons of available space in the drawings, etc. One skilled in the art would understand that these are essentially the same in substance. Note that any hexadecimal value is headed by "0x".

The motor assembly 106A transmits "the identifier of the motor assembly 106A+a request for present rotational speed" to the motor assembly 106B. The identifier of the motor assembly 106A is stated in the transmitting-end device ID 11 (FIG. 1A) representing the motor assembly 106A, or in the transmitting-end IP address 21 (FIG. 1B) representing the motor assembly 106A.

Figure 6:
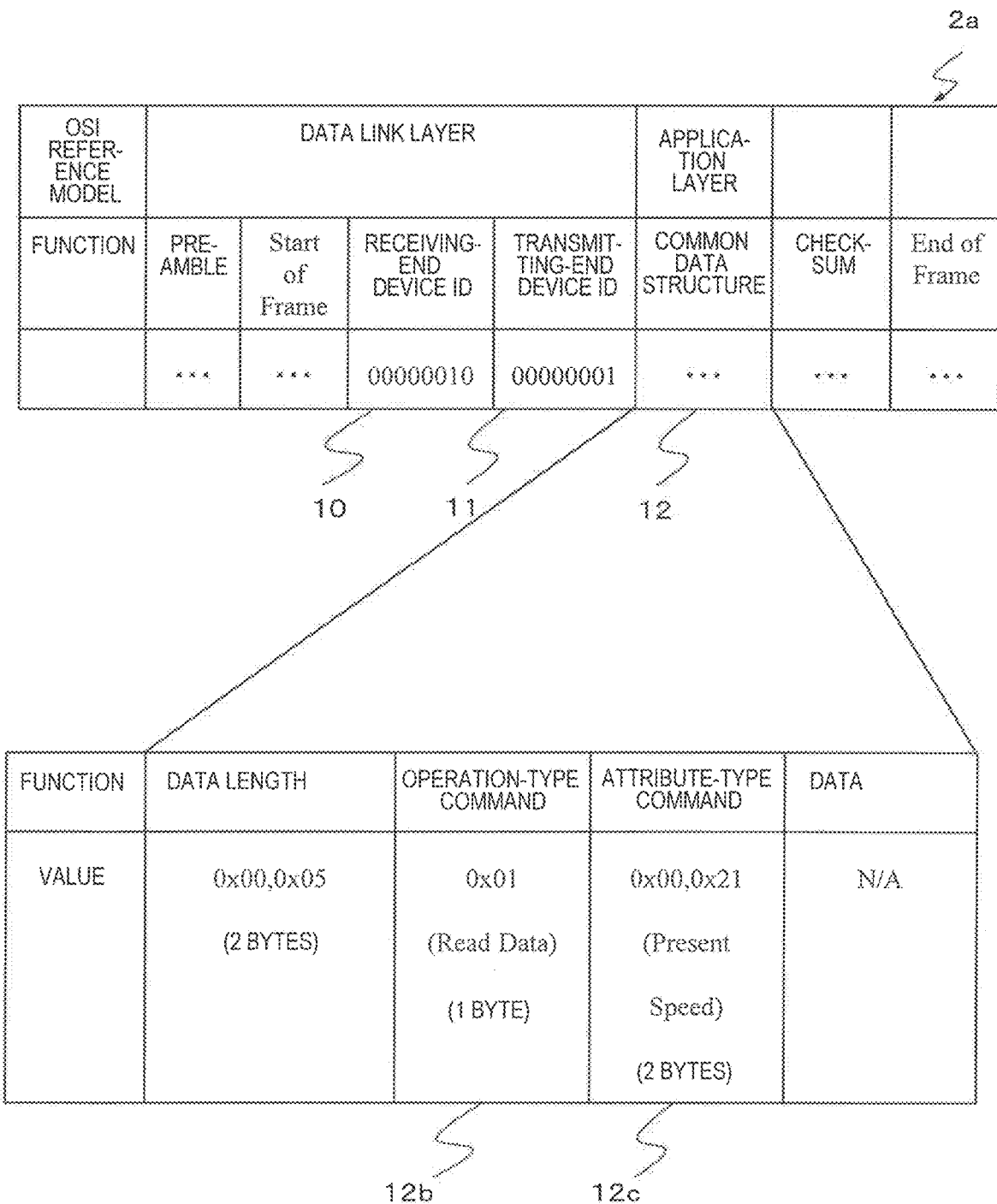
FIG. 6 is a diagram showing an exemplary data frame 2a according to an example embodiment of the present disclosure during communications under the RS-485 standard.

FIG. 6 shows an exemplary data frame 2*a* during communications under the RS-485 standard. The data frame 2*a* corresponds to the data frame 1*a* of FIG. 1A. Although any example corresponding to the data frame 1*b* for use in wireless communications as illustrated in FIG. 1B will be omitted from the explanation, one skilled in the art should be able to understand it based on the example of FIG. 6.

In the data frame 2*a*, a 1-byte value "00000010" representing the motor assembly 106B is stated as the receiving-end device ID 10, and a 1-byte binary value "00000001" representing the motor assembly 106A is stated as the transmitting-end device ID 11.

Also in the common data structure 12, a 1-byte value "0x01" corresponding to "Read Data command", which indicates a data read, is stated as the operation command 12*b*. In the attribute command field 12*c*, a 2-byte value "0x00, 0x21" corresponding to "Present Speed", which indicates the present rotational speed, is stated. The other data fields are not particularly related to the present disclosure. Therefore, explanation of the other data fields is omitted.

The motor assembly 106B receives a data frame 2*a* containing a command directed to itself. On the basis of the identifier that has been added as the transmitting-end ID, the processor 112B of the motor assembly 106B refers to a table that is stored in the memory 113B, and determines that the motor assembly which has transmitted the data frame is the motor assembly 106A.

The motor assembly 106B parses the operation command and attribute command that are contained in the common data structure 12 of the data frame 2a, so as to read the present rotational speed of the motor 116B. As a result, the motor assembly 106B is able to transmit the "transmitting-end ID information (motor assembly 106B)+ information of the present rotational speed" to the motor assembly 106A. Specific description of data frame to be transmitted by the motor assembly 106B will be omitted. Note that, immediately after receiving the commands, the motor assembly 106B may transmit a reception response command, indicating reception of the commands, to the motor assembly 106A.

4. Method of Determining a Motor Assembly to Arbitrate Communications within Multi-Motor System As has been described in the BACKGROUND ART section, in cases where a communications network was constituted by a large number of motor assemblies each having a communication function, a separately-provided host terminal would perform communications with each motor assembly. The host terminal would perform arbitrations of adjusting the order of starting communications and their timing, thus avoiding conflicts in communications.

As mentioned above, the multi-motor system 103 (FIG. 4) according to the present disclosure does not require a host terminal; that is, presence of a host terminal that arbitrates communications is not taken for granted. This means that a mechanism for arbitrating communications is newly needed.

Since it is only the motor assemblies that exist in the multi-motor system 103, there is a question as to how a motor assembly to arbitrate communications should be determined. Furthermore, after a motor assembly that arbitrates communications has been determined, if a new motor assembly is connected to the communications network, there emerges a question as to how the new motor assembly can know the motor assembly that arbitrates communications.

Accordingly, the inventors have defined a method of determining a motor assembly that arbitrates communications, and a method of making known the determined motor assembly, as follows.

In the following example, a specific motor assembly that arbitrates communications is referred to as an "arbitrator)". An arbitrator may also be referred to as a "specific motor assembly".

4.1. Method of Determining an Arbitrator

First, a method of determining an arbitrator will be described. Although the following description illustrates an operation of each motor assembly, it must be noted that the actual operation of each motor assembly is to be performed by the processor 113A (FIG. 5) and the like.

Suppose that the multi-motor system 103 shown in FIG. 4 is established within one device (e.g., the communication robot 30 (FIG. 3A)). When the device is powered ON, the motor assemblies will be activated altogether, and enter a state where they are capable of communications. At this point, no arbitrator exists yet. However, in the buffer 111A, each motor assembly has its own its own identifier (device ID or IP address).

Each motor assembly transmits its own identifier, being stored in the buffer 111A, to the entire communications network. As a method of doing this, broadcasting as in the data link layer of the OSI reference model may be adopted, for example. Note that "broadcast" means a data communication that takes place on a one-to-many basis, by designating all destinations within the same data link. Through this, each motor assembly is able to share the identifiers of all motor assemblies that exist on the communications network. For example, the motor assembly 106A (FIG. 5) stores the identifiers of all motor assemblies obtained to the memory 113A.

The identifiers of the motor assemblies are assigned by a predetermined order. In the case where the identifier of each motor assembly is an IP address according to IPv4, between an IP address network section and an IP host address section constituting the IP address, it is the numeric value in the IP host address section that allows the respective motor assemblies to be ordered. In the case where the identifier of each motor assembly is a device ID, too, by expressing the device ID in e.g. a binary number, the respective motor assemblies can be ordered.

In the present example embodiment, an arbitrator relies on the identifiers that are assigned by a predetermined order, in order to operate as one. More specifically, in the present example embodiment, a motor assembly having the smallest identifier operates as an arbitrator. As described above, each motor assembly stores the identifiers of all motor assemblies on the communications network in the memory 113A. Therefore, each motor assembly is able to determine which identifier is the smallest. Determining that the motor assembly itself has the smallest identifier, the motor assembly notifies all motor assemblies on the communications network that the motor assembly itself is the arbitrator. This notification can be achieved by broadcasting a data frame containing a command of arbitrator notification and its own identifier. In the present specification, an identifier that indicates being an arbitrator is defined as a "primary ID".

Next, a variant in sharing the identifiers of the motor assemblies will be described.

Since no arbitrator has been determined when each motor assembly tries to share the identifiers of all other motor assemblies, it may be possible for each motor assembly to broadcast its own identifier all at the same time. This may result in a conflict in communications, such that the identifiers of the motor assemblies cannot be shared, or substantial time may be required until the identifiers of the motor assemblies become shared.

Accordingly, each motor assembly may utilize its own identifier to adjust the point in time of transmitting its identifier. As described above, the identifiers of the motor assemblies are assigned by a predetermined order. Therefore, transmission of an identifier may be delayed by a time which results by multiplying the numeric value indicating the identifier with a predefined time (e.g. 20 milliseconds).

Figure 7:
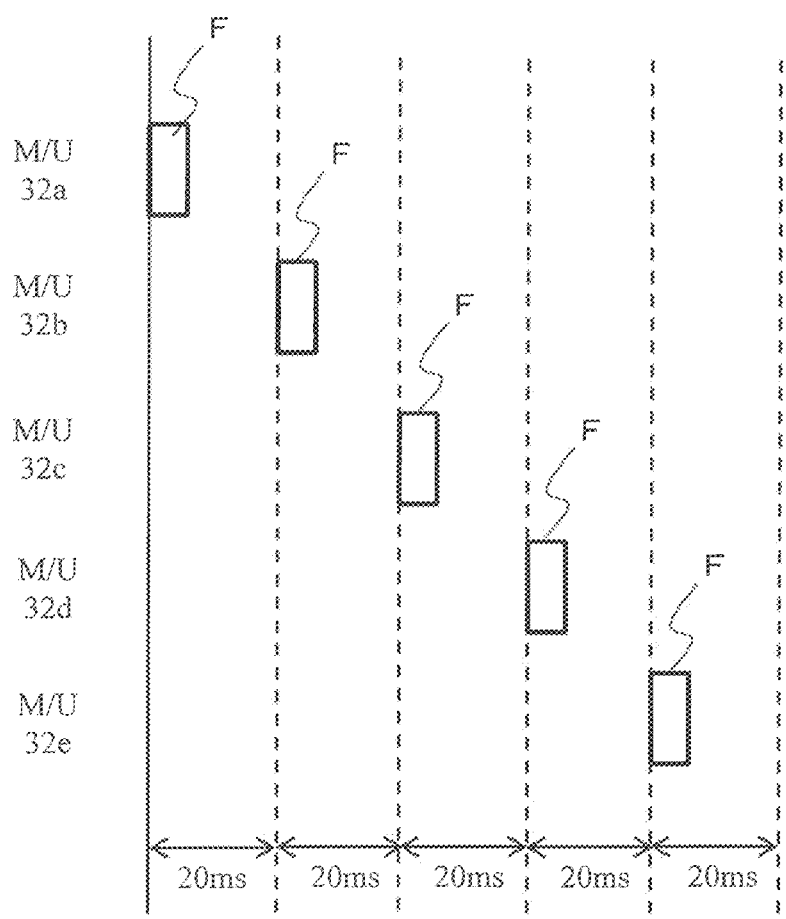
FIG. 7 is a diagram showing a transmission timing of data frames F containing identifiers before an arbitrator is decided according to an example embodiment of the present disclosure.

FIG. 7 shows a transmission timing of data frames F containing identifiers before an arbitrator is decided. The example of FIG. 7 shows the transmission timing of the motor assemblies (M/U) 32a to 32e illustrated in FIG. 4. It is assumed that the identifier of each motor assembly is incremented by one each, from the motor assemblies 32a through 32e. Each data frame F stores the identifier of the respective one of the motor assemblies 32a through 32e. As a result of this, while preventing conflicts between data frames flowing on the communications network, each motor assembly is able to share the identifiers of all motor assemblies on the communications network.

4.2. Method of Making Known a Determined Arbitrator

Next, a method of making known a motor assembly that arbitrates communications will be described.

Figure 8:
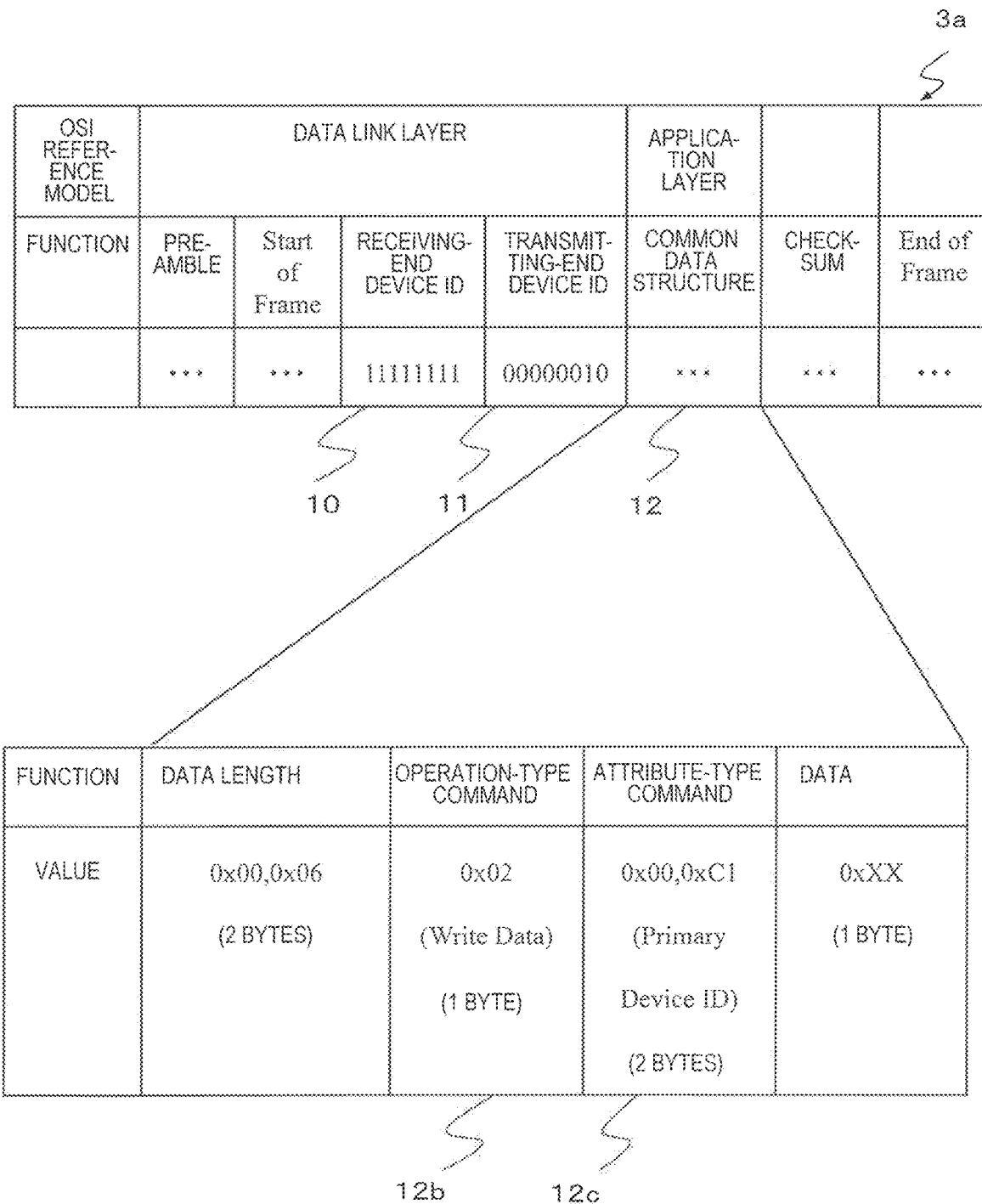
FIG. 8 is a diagram showing an exemplary data frame 3a according to an example embodiment of the present disclosure notifying that a motor assembly 106B is an arbitrator.

FIG. 8 shows an exemplary data frame 3a notifying that the motor assembly 106B is an arbitrator. The data frame 3a corresponds to the data frame 1a in FIG. 1A. Although any example corresponding to the data frame 1b for use in wireless communications as illustrated in FIG. 1B will be omitted from the explanation, one skilled in the art should be able to understand it based on the example of FIG. 8.

In the data frame 3a, a 1-byte binary value "11111111" indicating broadcast communication is stated as the receiving-end device ID 10, and a 1-byte binary value "00000010" representing the motor assembly 106B may be stated as the transmitting-end device ID 11.

Also in the common data structure 12, a 1-byte value "0x02" corresponding to "Write Data command", which indicates a data write, is stated as the operation command 12b. In the attribute command field 12c, a 2-byte value "0x00,0xC1" indicating a primary ID is stated. The other data fields are not particularly related to the present disclosure. Therefore, description of the other data field is omitted.

Note that the method of determining an arbitrator, where the motor assembly having the smallest identifier operates as an arbitrator, is an example. The motor assembly having the largest identifier may operate as an arbitrator, or an arbitrator may be decided through predetermined computations using the identifiers. Alternatively, a parameter possessed by each motor assembly, other than the identifier, may be utilized in deciding an arbitrator.

Figure 9:
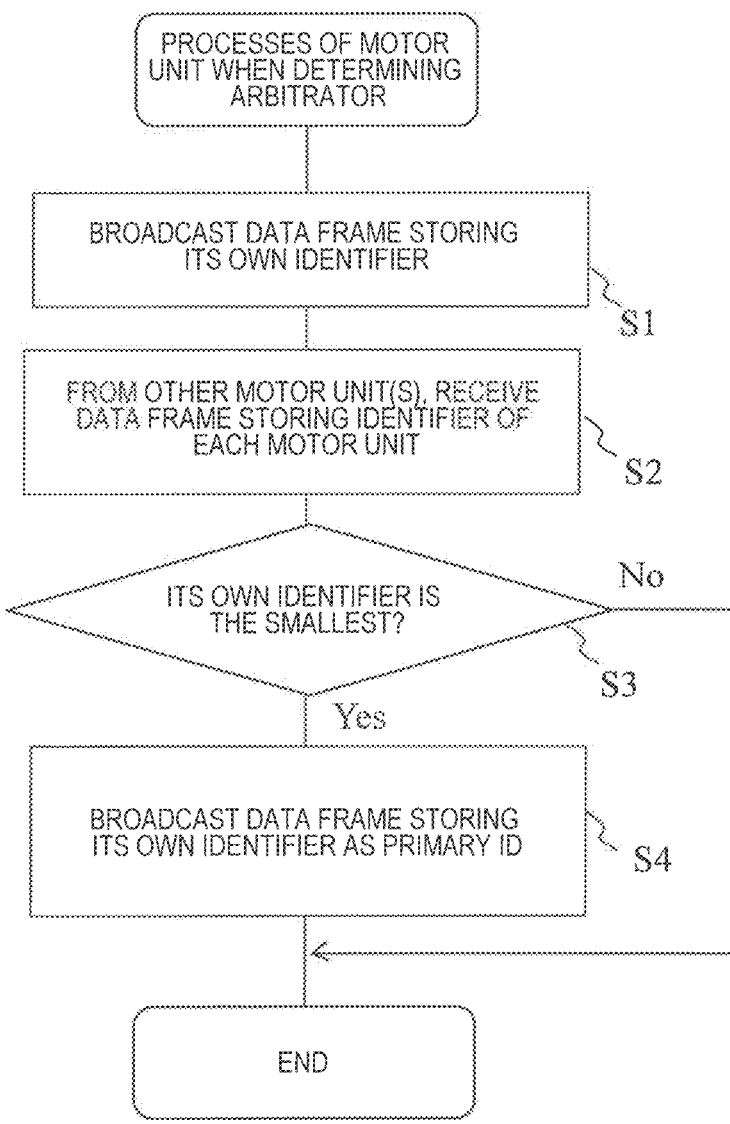
FIG. 9 is a flowchart showing a procedure of processes of a motor assembly in deciding an arbitrator according to an example embodiment of the present disclosure.

FIG. 9 is a flowchart showing a procedure of processes of each motor assembly in deciding an arbitrator. At step S1, each motor assembly broadcasts a data frame F storing its own identifier over the communications network.

At step S2, each motor assembly receives the data frames that have been broadcast from other motor assemblies. As a result of this, each motor assembly is able to share the identifiers of all motor assemblies on the communications network.

At step S3, each motor assembly determines whether or not its own identifier is the smallest among the identifiers of all motor assemblies. If its own identifier is the smallest, the process proceeds to step S4; otherwise, the process is ended.

At step S4, the motor assembly broadcasts the data frame 3 storing its own identifier as a primary ID. This allows all motor assemblies on the communications network to identify which motor assembly is the arbitrator.

The arbitrator that has been decided by the above method will thereafter perform arbitrations of communications to occur in the communications network, regarding order, timing, etc. Specifically, when a command such as a request for communication for the arbitrator is received from each motor assembly, the arbitrator transmits a communication-permitting response to any motor assembly which is allowed to transmit. As a result of this, arbitration on the communications network is realized. Although any well-known technique may be utilized for the arbitration method, any more specific description thereof will lie outside the scope of the present disclosure, and therefore will be omitted.

The arbitrator periodically transmits the data frame 3 shown in FIG. 8 over the communications network. This allows the other motor assemblies to know the present arbitrator. This also allows any motor assembly that is later powered ON to know that the arbitrator has already been decided.

4.3. Method of Changing Arbitrator

Now, consider a case where the arbitrator becomes unable to transmit the periodic data frame 3 due to a malfunction or the like.

All other motor assemblies that exist on the communications network wait for a predefined time, e.g. 1 second, and if the data frame 3 still cannot be received, again perform the process shown in FIG. 9 in order to determine a new arbitrator. The motor assembly that has so far been the arbitrator is incapable of communication, and therefore the motor assembly having the second smallest identifier now becomes an arbitrator. As the motor assembly that has become the arbitrator broadcasts the data frame 3 notifying a primary ID, all other motor assemblies update the primary ID to the identifier of the motor assembly that has become the arbitrator. As a result, thereafter, each motor assembly can transmit a command, such as a request for communication, to the new arbitrator for arbitration.

Among the identifiers of all motor assemblies that are shared, the motor assembly having the second smallest identifier may by itself notify the other motor assemblies that it is the arbitrator. With this method, an arbitrator can be determined more swiftly than performing the process of FIG. 9 anew.

With any of the above processes, even when the arbitrator has a malfunction, a next arbitrator can be swiftly decided.

A change of the arbitrator is not limited to when a malfunction occurs. For example, the arbitrator may be changed when a following situation occurs.

When it is determined that the arbitrator behavior has become abnormal, the arbitrator status can be passed down to another motor assembly. Being "abnormal" means a situation where, although the arbitrator is transmitting the data frame 3, the arbitrator fails to accept a request for communication from the other motor assemblies for a predetermined time or longer, for example. A possible case may be where a malicious third party has taken over the motor assembly operating as the arbitrator. By passing down the arbitrator status, even though the arbitrator may have been taken over, the multi-motor system 103 can still continue to operate, without losing control.

The motor assembly operating as the arbitrator suffers a greater processing load than do the other motor assemblies. Therefore, by changing the arbitrator with any arbitrary timing or predefined timing, the processing load can be appropriately dispersed over the other motor assemblies, so that any particular motor assembly will not suffer too much processing load. This can prevent the product life of only a particular motor assembly from being reduced.

Through the above processes, even if a host terminal does not exist in the multi-motor system, an arbitrator to take the place of a host device can be selected from among the motor assemblies on the communications network. Thus, in a communications network of motor assemblies in which a host device does not next, communications can be performed while avoiding conflicts in communications or the like.

5. Inter-Motor Assembly Communications to be Performed in Multi-Motor System

Hereinafter, specific examples of inter-motor assembly communications to be performed in the multi-motor system 103 will be described.

As in the case of robots, many electric products have a plurality of motor assemblies mounted thereon, which realize an integrated operation of the entire system by cooperating with one another. For this, notifications of STATUS information of the motor assemblies are indispensable. As described above, a communications network for control purposes has been a centrally-controlled network where a single host device collects the status information of all motor assemblies.

In any communications protocol for a two-body interaction between an instructing side and an executing side, it suffices to have a single instructor make a notification of a requested state parameter, and only one address can be designated as the receiving-end designation. If for some reason it becomes necessary to transmit information to motor assemblies other than the instructor, the instructor will need to intervene (i.e., relay).

In a conventional communications protocol which is adopted in the control system for a centrally-controlled network, if status information is to be shared among a plurality of motor assemblies, switching of the chain of command needs to be made or three-body communications via a mediating device needs to be performed, thus resulting in redundant communications. In a communications network of a multi-motor system in which large amounts of data need to be exchanged by sensors, improvements need to be made so that status information will be efficiently transmitted and that the network load may be reduced.

Thus, the inventors have conducted studies to realize inter-motor assembly communications, and defined a new communications protocol. Specifically, the inventors have newly defined two commands (Send Status Information command and Send Status Info Timing command).

In the present example embodiment, the two commands are used in combination, so that the following setting information can be designated: "type of status information to be transmitted", "receiving end(s) (plural designation is possible)", "transmission timing (cycle), transmission start/end times".

By using these two commands, with any arbitrary timing, any status information that a given motor assembly possesses can be transmitted to any motor assembly or any other device within the network. Moreover, the designations as to which status information is to be transmitted to which motor assembly(s), etc. can be made altogether at one time. The outline of an operation using the two commands may be as follows.

First, the multi-motor system includes a plurality of motor assemblies including first, second and third motor assemblies, and a communications network that connects the plurality of motor assemblies. In the multi-motor system, communications are performed through exchanges of commands via the communications network.

The processor of the first motor assembly generates a first command, and transmits it to the second motor assembly via the communication circuit. The first command, i.e., "Send Status Info Timing" command, contains an instruction to cause status information (indicating the state of the second motor assembly) to be transmitted, and an identifier identifying the motor of the third motor assembly being the receiving end of the status information. The instruction to cause status information to be transmitted includes instructions of transmission timing, such as points in time to make transmission and intervals therebetween.

Having received the first command, the processor of the second motor assembly generates a second command based on the first command, and transmits the second command to the third motor assembly in accordance with the transmission timing which is designated by the first command. The second command, i.e., "Send Status Information command", contains a value of status information of the second motor assembly.

Once the first motor assembly transmits the first command to the second motor assembly, the second motor assembly will subsequently transmit the second command to the third motor assembly, with the transmission timing designated by the first command. This eliminates the need to make switching of the chain of command or performing three-body communications via a mediating device. Moreover, the plurality of motor assemblies that are connected to the network are able to efficiently share their operation statuses with one another while reducing the amount of communications. If necessary, a conventional method of communications that utilizes a host terminal may also be adopted.

Hereinafter, with reference to FIG. 10, a specific example will be described. The aforementioned pattern concerning which information is to be transmitted from the second motor assembly to the third motor assembly will be referred to as a "transmission pattern" hereinafter.

Figure 10:
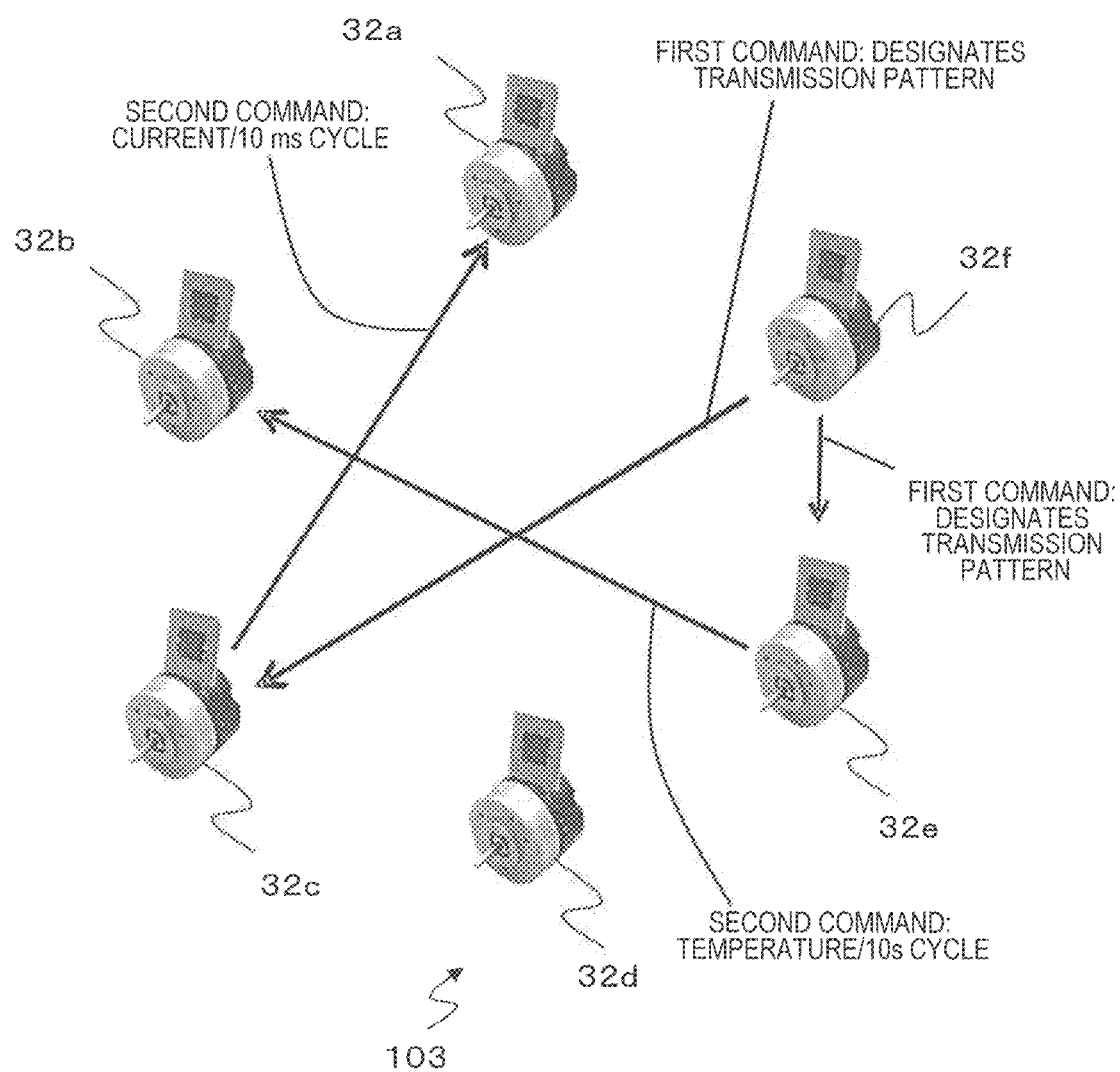
FIG. 10 is a diagram showing a multi-motor system 103 according to an example embodiment of the present disclosure in which transmission of information is performed based on each of two transmission patterns.

FIG. 10 shows a multi-motor system 103 in which transmission of information is performed based on each of two transmission patterns. An example where a motor assembly 32$f$ transmits the two transmission patterns will be described. In the following description, communications by the motor assemblies 32$a$ through 32$f$ are under no particular restrictions; under the arbitration processes of a motor assembly operating as an arbitrator as described above, however, communications may be permitted and information may be transmitted.

The motor assembly 32$f$ transmits two first commands, in which respectively different transmission patterns are stated, to the motor assemblies 32$c$ and 32$e$. For example, the motor assembly 32$f$ transmits a first command stating a first transmission pattern to the motor assembly 32$c$. Upon receiving the first command, the motor assembly 32$c$ transmits a second command to the motor assembly 32$a$ in accordance with the first transmission pattern. Moreover, the motor assembly 32$f$ transmits a first command stating a second transmission pattern to the motor assembly 32$e$. Upon receiving the first command, the motor assembly 32$e$ transmits a second command to the motor assembly 32$b$ in accordance with the second transmission pattern.

For example, the first transmission pattern may indicate that information concerning a current flowing in the motor assembly 32$c$ is to be transmitted to the motor assembly 32$a$ in cycles of 10 milliseconds. On the other hand, the second transmission pattern may indicate that information concerning temperature of the motor assembly 32$c$ is to be transmitted to the motor assembly 32$b$ in cycles of 10 seconds.

As the status information to be transmitted, "information of a voltage value" may alternatively be designated. The following are designated by the "Send Status Info Timing command" corresponding to the first command: the identifier identifying a receiving end of the status information; the status information to be transmitted, e.g., "current", "voltage", and "temperature"; and the transmission cycle, e.g., "10 milliseconds", "1 hour cycle", and "in cycles of 10 seconds".

On the other hand, the motor assembly that has received the first command causes the status information for transmission to be included in the "Send Status Information command", which is the second command, and transmits this second command to a motor assembly that is designated by the first command.

Note that a plurality of motor assemblies may be designated as the receiving ends of the status information of a given motor assembly, to be stated in the transmission pattern. Depending on each receiving-end motor assembly, the specific content of the status information may be separately and independently designated.

Figure 11:
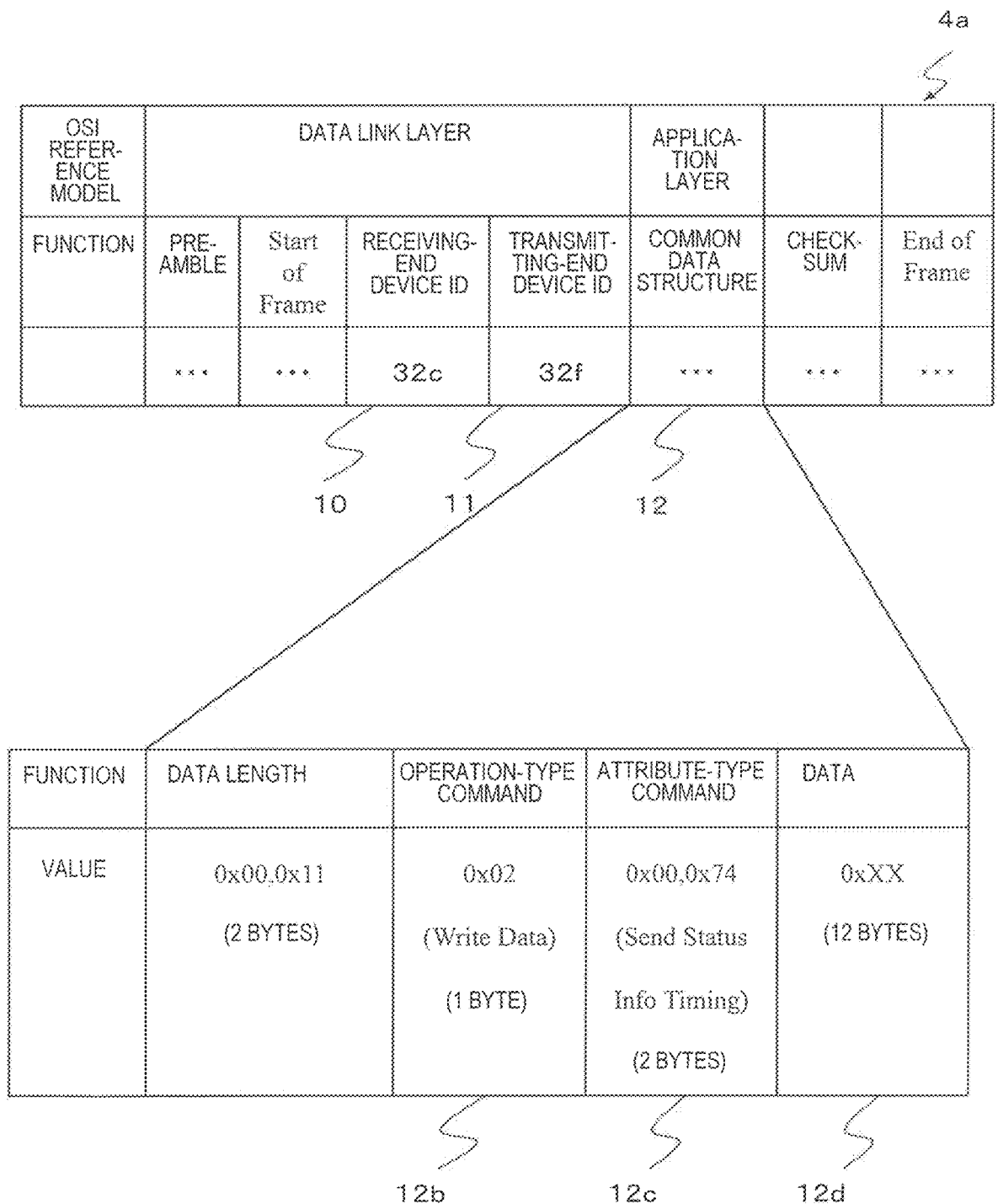
FIG. 11 is a diagram showing an example of a data frame 4a in which "Send Status Info Timing command", which is a first command, is stated according to an example embodiment of the present disclosure.

FIG. 11 shows an example of a data frame 4$a$ in which "Send Status Info Timing command", which is the first command, is stated. FIG. 12 shows details of the data field 12$d$ in the Send Status Info Timing command.

Figure 13:
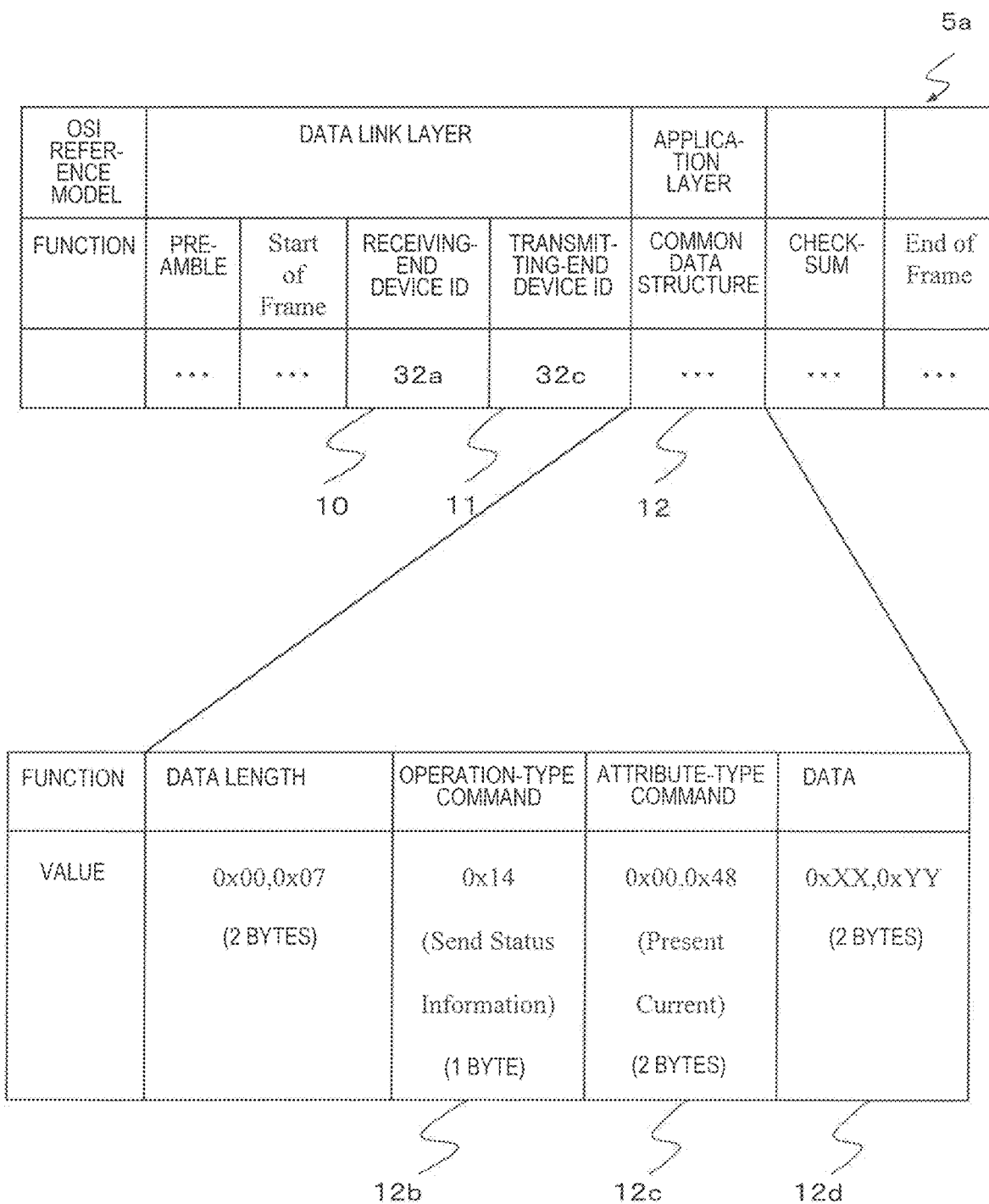
FIG. 13 is a diagram showing an example of a data frame 5a in which "Send Status Information command", which is a second command, is stated according to an example embodiment of the present disclosure.

On the other hand, FIG. 13 shows an example of a data frame 5$a$ in which "Send Status Information command", which is the second command, is stated. The data frames 4$a$ and 5*a* correspond to the data frame 1*a* in FIG. 1A. Although any example corresponding to the data frame 1*b* for use in wireless communications as illustrated in FIG. 1B will be omitted from the explanation, one skilled in the art should be able to understand it based on the examples of FIGS. 11 and 12.

In the data frame 4*a* shown in FIG. 11, a 1-byte value representing the motor assembly 32*c* is stated as the receiving-end device ID 10, and a 1-byte value representing the motor assembly 32*f* is stated as the transmitting-end device ID 11. In FIG. 11, only reference numerals of the motor assemblies 32*c* and 32*f* are shown, while omitting any specific example values representing the respective motor assemblies.

Moreover, in the common data structure 12, a 1-byte value "0x02" corresponding to "Write Data command" is stated as the operation command 12*b*. In the attribute command field 12*c*, a 2-byte value "0x00, 0x74" corresponding to "Send Status Info Timing command", which designates a transmission timing of the status information, is stated. Furthermore, information as shown in FIG. 12 is stated in the data field 12*d*.

In the example of FIG. 12, eight subfields 12*d*-1 through 12*d*-8 exist in the data field 12*d*. Numeric values between parentheses represent the number of bytes in the respective subfields.

In the present example embodiment, each field represents the following content. The subfield 12*d*-1 indicates that the status information to be transmitted is "current". The subfield 12*d*-2 indicates that the start time is in units of "milliseconds". The subfield 12*d*-3 indicates that the start time is "immediately". The subfield 12*d*-4 indicates that the end time is in units of "milliseconds". The subfield 12*d*-5 indicates that the end time is "endless". The subfield 12*d*-6 indicates that the cycle is in units of "milliseconds". The subfield 12*d*-7 indicates that the cycle is "10 milliseconds". The subfield 12*d*-8 indicates that the receiving end is the "motor assembly 32*a*".

As shown in FIG. 12, the data field 12*d* designates what is transmitted to which motor assembly and when. As a result, a motor assembly receiving the data frame 4*a* is able to transmit its own status information to the designated motor assembly in accordance with the designated timing. When transmitting the status information, the data frame 5*a* shown in FIG. 13 is utilized.

With reference to FIG. 13, the data frame 5*a* will be described. An example where status information is transmitted from the motor assembly 32*c* to the motor assembly 32*a* as illustrated in FIG. 10 will be illustrated.

In the data frame 5*a*, a 1-byte value representing the motor assembly 32*a* is stated as the receiving-end device ID 10, and a 1-byte value representing the motor assembly 32*c* is stated as the transmitting-end device ID 11. In FIG. 13, only reference numerals of the motor assemblies 32*a* and 32*c* are shown, while omitting any specific example values representing the respective motor assemblies.

In the common data structure 12, a 1-byte value "0x14" corresponding to "Send Status Information command" is stated as the operation command 12*b*. In the attribute command field 12*c*, a 2-byte value "0x00, 0x48" corresponding to "present current" is stated. Note that a numeric value representing the "present current" is to be stated in the data field 12*d*.

Based on the first transmission pattern, the motor assembly 32*c* transmits information of a current value flowing in the motor assembly 32*c* to the motor assembly 32*a* in cycles of 10 milliseconds.

The construction of the first command, including the second transmission pattern, to be transmitted from the motor assembly 32*f* to the motor assembly 32*e*, which has been described in connection with FIG. 10, is along the lines of FIGS. 11 and 12. The construction of the second command to be transmitted from the motor assembly 32*e* to the motor assembly 32*n* in accordance with the first command is along the line of FIG. 13. Based on the second transmission pattern, the motor assembly 32*e* transmits information of the temperature of the motor assembly 32*e* to the motor assembly 32*b* in cycles of 10 seconds.

Thus, as a given motor assembly transmits a transmission pattern to another motor assembly only once, a plurality of motor assemblies that exist in the multi-motor system 103 are able to directly share their status information with the other motor assemblies, spontaneously with required timing and without repetitive transmission commands. According to the present example embodiment, since communications do not need to be performed via a host terminal, it is possible to suppress waste of resources, e.g., the communication band, and congestions in the communications network.

Absent security restrictions/requirements, etc., the transmission pattern for status information can be designated from any motor assembly within the network. Under an automatic transmission mode, the transmission cycle may be arbitrarily set across a wide range, from milliseconds to seconds, minutes, hours, days, or years. The status information to be transmitted may concern all possible parameters that are defined as attribute values of a motor assembly. Moreover, the transmission pattern can be rewritten with any arbitrary timing. Furthermore, a point in time of starting transmission, and a point in time of ending transmission, of a notification may also be set.

In the above description, the receiving end of "Send Status Info Timing command", which is the first command, is one specific motor assembly. The receiving end of "Send Status Information command", which is the second command, is also one specific motor assembly. However, these are examples. As the receiving ends of either one, or both, of the first command and second command, a 1-byte binary value "11111111" indicating broadcast communication may be stated; this will allow all motor assemblies within the same data link to be set as the receiving ends.

As the receiving ends of the first command and/or the second command, a plurality of motor assemblies may be collectively designated. By regarding a plurality of motor assemblies as one group, an identifier (group ID) that uniquely identifies each group is previously assigned. A motor assembly belonging in each group determines whether the group ID to which it belongs is stated in the data frame or not, and if the group ID to which it belongs is stated, acquires that data frame. Thus, apart from its own identifier, a group identifier may be introduced to realize so-called multicast transmission.

Transmission of status information utilizing a transmission pattern as aforementioned needs to be performed at a point in time that was intended by the motor assembly which generated the transmission pattern. Therefore, the point in time to serve as a reference (e.g., the present time) for the transmission cycle, the start time, the end time, and so on, needs to be synchronized among the motor assemblies.

A communications network may suffer a different level of transmission delay depending on the length of the transmission distance and the amount of traffic. Therefore, when information indicating a point in time is transmitted between motor assemblies, synchronization between each other may possibly be not achieved.

Therefore, in the present example embodiment, a time management function of an operating system (OS) that causes the processors of the motor assemblies to operate is utilized. The OS utilizes e.g. a Network Time Protocol (NTP) to access an NTP server which was previously installed. The NTP server is directly connected to an accurate time source, such as the GPS, a standard radio wave, an atomic clock, or the like. Based on a point in time that is acquired from the NTP server, the OS of each motor assembly synchronizes a clock (not shown) that the respective motor assembly possesses to a correct point in time (absolute time). As the OS executes the aforementioned synchronization process with a predetermined cycle, or with a timing when the congestion on the communications network is small enough, each motor assembly is able to retain the absolute time. The process of acquiring the absolute time may be performed before start of communications.

On the basis of this absolute time, the motor assembly generating the transmission pattern designates a transmission cycle, a start time, an end time, etc., for the status information. As a result, any motor assembly that receives the transmission pattern, also retaining the absolute time, is able to transmit the status information with the intended timing.

The aforementioned operation can also be considered as booking an operation for each motor assembly to "transmit predetermined status information to a specific motor assembly at the absolute time of 12:00:00", for example. The designated motor assembly operates when the absolute time reaches 12:00:00. As a result of this, a synchronized operation between motor assemblies is realized. This method permits a synchronized operation even in long-distance communications or communications with large amounts of traffic, where delays in communications might occur.

Sharing of the status information based on transmission patterns may also be utilized for purposes of behavior monitoring, for example.

A given motor assembly regularly receives status information from a specific motor assembly that operates based on a transmission pattern. Through log management of the received status information, it is possible to monitor whether a specific motor assembly has been taken over by an unauthorized third party or not. As used herein, "log management" means not only checking whether exchanges of status information are being regularly performed, but also checking whether status information of the intended content is being received.

Thus, example embodiments of the present disclosure have been described. The above examples are not supposed to limit a motor assembly or a multi-motor system established by a plurality of motor assemblies according to the present disclosure.

In the above examples, an IP address or a device ID of a motor assembly is utilized as the receiving-end device ID 10 or the transmitting-end device ID 11. However, since a chief functional part of a motor assembly is the motor, the identifier may also be called an identifier of the motor.

6. Variants of Multi-Motor System which Performs Communications Between Motor Assemblies The example of FIG. 3A has illustrated an implementation where a plurality of motor assemblies within the communication robot 30*a* communicate with one another. The examples of FIG. 3B and FIG. 3C have respectively illustrated an implementation where a plurality of motor assemblies within the powered exoskeleton suit 30*b* communicate with one another and an implementation where a plurality of motor assemblies within the commercial refrigerated showcase 30*c* communicate with one another. In any of these examples, communications between a plurality of motor assemblies that are included within a single system (i.e., a single product) are contemplated.

However, it would also be possible for motor assemblies that are respectively contained in different systems to communicate with one another.

FIG. 14 shows a person 50 wearing a powered exoskeleton suit 30*b* and a greenhouse 60. In the greenhouse 60, a plurality of fan motor assemblies to rotate ventilation fans are provided at positions indicated with arrows.

An example where the person 50 does harvesting work for vegetables within the greenhouse 60. Wearing the powered exoskeleton suit 30*b*, the person 50 harvests vegetables with an assistance force from the powered exoskeleton suit 30*b*, and carries a harvesting basket accommodating the vegetables.

In this example, the plurality of motor assemblies on the powered exoskeleton suit 30*b* and the plurality of ventilation fans in the greenhouse 60 communicate with one another for cooperative operation.

For example, near the position where the person 50 is working by using the powered exoskeleton suit 30*b*, a temperature inhomogeneity due to heat buildup, etc., may be expected. Therefore, when the person is doing harvesting work with a harvesting basket, one or more motor assemblies on the powered exoskeleton suit transmit a notification to each fan motor assembly in the greenhouse 60 that it/they are currently operating. This notification allows each fan motor assembly in the greenhouse 60 to know that the person 50 is working by using the powered exoskeleton suit 30*b*.

In the present example embodiment, each fan motor assembly in the greenhouse 60 acquires information indicating the position of the powered exoskeleton suit 30*b*. The position of the powered exoskeleton suit 30*b* may be acquired by a well-known method. For example, a wireless tag may be internalized in the powered exoskeleton suit 30*b*, and a beacon signal which is transmitted from the wireless tag may be received by one or more antenna devices in the greenhouse 60. By using a well-known direction-of-arrival estimation algorithm, e.g., a maximum likelihood estimation method, a direction of arrival of the beacon signal can be estimated. As a result, the position of the wireless tag in the greenhouse 60, i.e., the position of the powered exoskeleton suit 30*b*, can be estimated.

Each fan motor assembly in the greenhouse 60 having acquired information of the position of the powered exoskeleton suit 30*b* autonomously controls rotation of its own motor. Any fan motor assembly that exists within a predetermined range, e.g. 15 m, from the position of the powered exoskeleton suit 30*b* will make its rotational speed higher than usual. As a result, a temperature inhomogeneity can be prevented from occurring in the powered exoskeleton suit 30*b*.

Figure 15A:
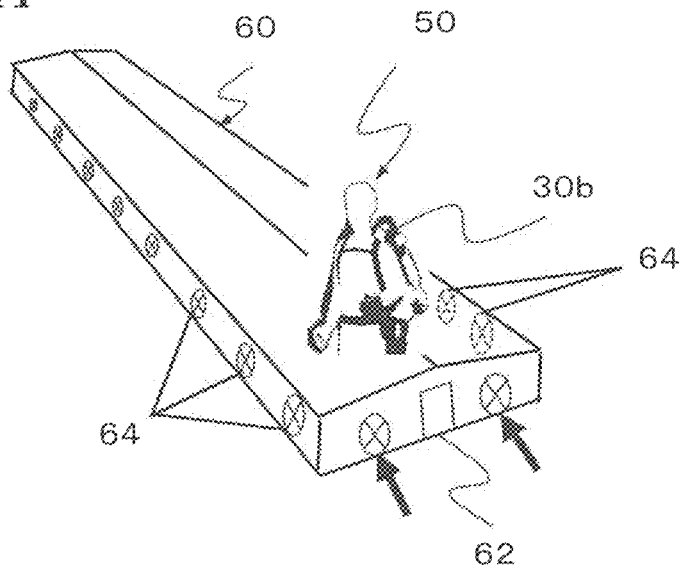
FIG. 15A is a diagram showing a plurality of fan motor assemblies 64 which increase their rotational speeds when the person 50 is engaged in harvesting work near an entrance 62 of the greenhouse 60 according to an example embodiment of the present disclosure.

FIG. 15A shows a plurality of fan motor assemblies 64 which increase their rotational speeds when the person 50 is engaged in harvesting work near an entrance 62 of the greenhouse 60.

Figure 15B:
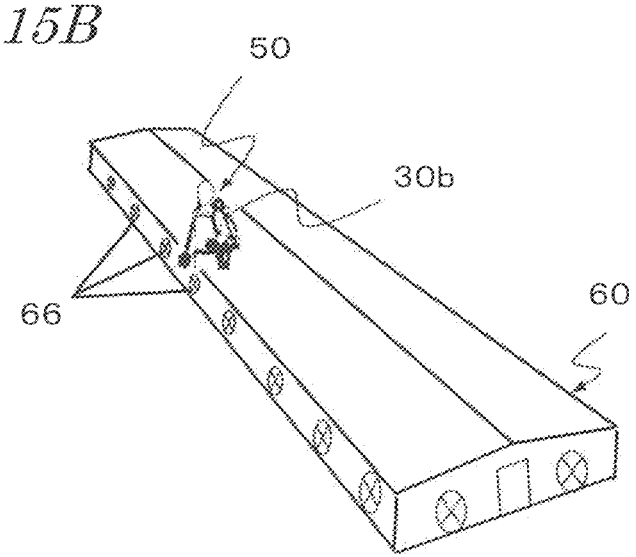
FIG. 15B is a diagram showing still another plurality of fan motor assemblies 66 which increase their rotational speeds as the person 50 moves according to an example embodiment of the present disclosure.

FIG. 15B shows still another plurality of fan motor assemblies 66 which increase their rotational speeds as the person 50 moves.

In either one of the examples of FIG. 15A and FIG. 15B, the fan motor assemblies other than the fan motor assemblies 64 and 66 are rotating at their usual rotational speeds.

Note that an amount of physical motion of the person 50 can be estimated from the level of total power consumption by the powered exoskeleton suit 30*b*. As each motor assembly on the powered exoskeleton suit 30*b* stores data indicating a power consumption level to a packet and transmits it, each fan motor assembly in the greenhouse 60 is able to calculate a level of total power consumption. In accordance with the level of total power consumption, the fan motor assemblies in the greenhouse 60 may increase or decrease the rotational speed of the motor. More specifically, a number of classifications may be defined according to levels of total power consumption, and if the total power consumption belongs in the highest classification, the relevant fan motor assembly may rotate its motor the fastest. In the meantime, a "predetermined range" for determining the relevant fan motor assembly may be expanded. On the other hand, if the total power consumption belongs in the lowest classification, the relevant fan motor assembly may rotate its motor at a rotational speed which is higher than its usual rotational speed but is not the fastest.

The powered exoskeleton suit 30*b* may also be utilized as a sensor for detecting motion of joint of the person 50. For example, suppose that the person 50 who has entered greenhouse 60 suddenly becomes ill and collapses. A quick treatment will be desired, and if the collapsed state continues for a long time, the person 50 may suffer from heatstroke depending on the room temperature within the greenhouse 60.

In anticipation of such situations, the powered exoskeleton suit 30*b* is monitoring to see if any motion of the person 50 is detectable for a predetermined time, e.g., 15 seconds. Through communications with one another, if it is detected that none of the motor assemblies has driven the motor for 15 seconds or more, each motor assembly transmits a packet corresponding to an emergency signal. The packet may contain, as an operation command, a 1-byte value "0x02" corresponding to "Write Data command", which indicates a data write, and as an attribute command, a 2-byte value "0x00" indicating an emergency.

Each fan motor assembly receiving the packet transmits to the upper device 150 a notification that a motor(s) on the "powered exoskeleton suit is sending out an emergency signal". In response to receiving the notification, the upper device 150 may report to a person in charge, or a family member, that an emergency has occurred. Receiving the report, the person in charge or family member may go to the greenhouse 60 in order to check on the person 50.

Note that the above-described example embodiment is an example, which does not limit the multi-motor system according to the present disclosure.

INDUSTRIAL APPLICABILITY

A motor assembly according to the present disclosure can be used in a multi-motor system having a communications network. The multi-motor system is broadly applicable in controlling a plurality of motors.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor assembly used in a multi-motor system in which a plurality of motor assemblies perform communications via a communications network, the motor assembly comprising:
a motor;
a control circuit to generate a control signal to cause the motor to rotate;
a motor driving circuit to cause a current to flow in the motor based on the control signal;
a storage to store a first identifier uniquely identifying the motor assembly and a second identifier uniquely identifying each of the plurality of motor assemblies within the communications network; and
a communication circuit to perform transmission and reception of a data frame with another motor assembly in the multi-motor system; the communication circuit storing to the data frame the first identifier indicating itself as a transmitting end, the second identifier uniquely identifying the other motor assembly as a receiving end, and a request concerning an operation to be performed by the other motor assembly, and transmitting the data frame to the other motor assembly.

2. The motor assembly of claim 1, wherein
the communication circuit performs transmission and reception of a data frame with another motor assembly in the multi-motor system; and
the communication circuit:
stores, to a data frame the first identifier indicating itself as a transmitting end, the second identifier uniquely identifying the other motor assembly as a receiving end, and a request concerning an operation to be performed by the other motor assembly, and transmits the data frame to the other motor assembly; and
receives, from the other motor assembly a data frame containing the second identifier of the other motor assembly being a transmitting end, the first identifier of the motor assembly itself as a receiving end, and a request concerning an operation to be performed by itself, and, in response to the request from the other motor assembly, transmits a data frame having the second identifier indicating a receiving end added thereto and having the first identifier indicating a transmitting end added thereto.

3. The motor assembly of claim 1, wherein the data frame includes an operation command that defines the request concerning the operation to be performed by the other motor assembly.

4. The motor assembly of claim 3, wherein the data frame includes an attribute command indicating a static or dynamic attribute concerning the motor in the other motor assembly.

5. The motor assembly of claim 4, wherein the operation command is a request to read or write the attribute that is designated by the attribute command.

6. The motor assembly of claim 2, wherein the data frame includes an operation command that defines the request concerning the operation to be performed by the motor assembly itself.

7. The motor assembly of claim 6, wherein the data frame further includes an attribute command indicating a static or dynamic attribute concerning the motor.

8. The motor assembly of claim 7, wherein the operation command is a request to read or write the attribute that is designated by the attribute command.

9. The motor assembly of claim 1, wherein the first identifier and the second identifier are device identifiers of devices which define the plurality of motor assemblies.

10. A multi-motor system comprising:
a plurality of motor assemblies including first, second, and third motor assemblies; and
a communications network connecting the plurality of motor assemblies;
each of the plurality of motor assemblies including:

a motor;
a control circuit to generate a control signal that causes the motor to rotate;
a driving circuit to cause a current to flow in the motor based on the control signal;
a storage to store an identifier uniquely identifying the motor within the communications network; and
a communication circuit to perform communications via the communications network; wherein
the control circuit of the first motor assembly:
generates a first command including:
an instruction to cause status information indicating a state of the receiving motor assembly to be transmitted;
an identifier that identifies a motor of the third motor assembly being a receiving end of the status information; and
a transmission timing of the status information; and
transmits the first command to the second motor assembly via the communication circuit; and
the control circuit, having received the first command second motor assembly, transmits a second command including the status information of the second motor assembly to the third motor assembly based on the first command and with the transmission timing.

11. The multi-motor system of claim 10, wherein the transmission timing in the first command includes a transmission cycle.

12. The multi-motor system of claim 10, wherein the transmission timing in the first command includes a transmission start time and a transmission end time.

13. A multi-motor system comprising:
a plurality of motor assemblies; and
a communications network connecting the plurality of motor assemblies;
each of the plurality of motor assemblies including:
a motor;
a control circuit to generate a control signal to cause the motor to rotate;
a motor driving circuit to cause a current to flow in the motor based on the control signal;
a storage to store an identifier uniquely identifying the motor within the communications network; and
a communication circuit to perform communications via the communications network; wherein
the respective identifiers of the plurality of motor assemblies are assigned by a predetermined order; and
one specific motor assembly that is determined according to the predetermined order arbitrates the communications to be performed within the communications network.

14. The multi-motor system of claim 13, wherein, via the communication circuit, each of the plurality of motor assemblies except for the specific motor assembly receives a notification that the specific motor assembly is the motor assembly that arbitrates the communications from the specific motor assembly.

15. The multi-motor system of claim 14, wherein each of the plurality of motor assemblies except for the specific motor assembly receives the notification at a predetermined cycle from the specific motor assembly.

16. The multi-motor system of claim 14, wherein, if each of the plurality of motor assemblies except for the specific motor assembly fails to receive the notification from the specific motor assembly at a predetermined cycle, one motor assembly that is determined according to the predetermined order from among the plurality of motor assemblies except for the specific motor assembly arbitrates the communications to be performed within the communications network as a new specific motor assembly.

17. The multi-motor system of claim 13, wherein the notification includes the identifier of the specific motor assembly.

18. The multi-motor system of claim 13, wherein, prior to the communications, the identifier of the specific motor assembly is shared among the plurality of motor assemblies.

19. The multi-motor system of claim 18, wherein each of the plurality of motor assemblies, when first becoming able to perform communications, transmits the identifier to the other motor assemblies after observing a delay time that is determined in accordance with the identifier that is stored in the storage device.

20. The multi-motor system of claim 13, wherein, as the identifier, each of the plurality of motor assemblies stores an ordinal number in the storage.

* * * * *